US012801582B2

(12) United States Patent
Elyasi Langarani et al.

(10) Patent No.: US 12,801,582 B2
(45) Date of Patent: Nov. 17, 2026

(54) RAPID RESPONSE REFINEMENT SYSTEM FOR ARTIFICIAL INTELLIGENCE CHAT ENVIRONMENT

(71) Applicant: Amazon Technologies, Inc., Reno, NV (US)

(72) Inventors: Mahsa Sadat Elyasi Langarani, Redmond, WA (US); Sopan Khosla, Sunnyvale, CA (US); Rashmi Gangadharaiah, San Jose, CA (US); Jeremiah James Bill, Long Island City, NY (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 18/962,434

(22) Filed: Nov. 27, 2024

(65) Prior Publication Data

US 2026/0147737 A1 May 28, 2026

(51) Int. Cl.
*G06F 16/00* (2019.01)
*G06F 16/215* (2019.01)
*G06F 16/3329* (2025.01)

(52) U.S. Cl.
CPC ...... *G06F 16/215* (2019.01); *G06F 16/33295* (2025.01)

(58) Field of Classification Search
None
See application file for complete search history.

(56) References Cited

U.S. PATENT DOCUMENTS 8,078,630 B2 * 12/2011 Dexter ................ G06F 16/3329 707/758
2018/0032574 A1 * 2/2018 Vandenberg .......... G06F 16/248
2025/0252032 A1 * 8/2025 Shah .................. G06F 11/3428

FOREIGN PATENT DOCUMENTS

EP 3971729 A1 * 3/2022 ....... G06F 16/24568

OTHER PUBLICATIONS

International Search Report and Written Opinion issued in PCT Application No. PCT/US2025/057230 dated Mar. 18, 2026.
Li et al., “RAC: Efficient LLM Factuality Correction with Retrieval Augmentation”, arXiv, arXiv:2410. 15667v1 [cs. CL], Oct. 21, 2024, pp. 25145-25159, XP093368589, https://arxiv.org/pdf/2410.15667.
Kang et al., “Ever: Mitigating Hallucination in Large Language Models through Real-Time Verification and Rectification”, arXiv, arXiv:2311.09114v2 [cs. CL], Feb. 25, 2024, 17 pages, XP093368431, https://arxiv.org/pdf/2311.09114.

* cited by examiner

*Primary Examiner* — Bai D Vu
(74) *Attorney, Agent, or Firm* — Hogan Lovells Cadwalader US LLP

(57) ABSTRACT

Approaches presented herein relate to an answer refinement system that may be included as part of a generative artificial intelligence (AI) pipeline. As content is produced by one or more generative AI models, the answer refinement system may segment the answer into chunks and then validate information within each of the chunks. Chunks that include invalid information may be rewritten or otherwise modified to correct errors. Chunks that are valid may be further analyzed for conditional validity and conditionally valid chunks may be modified to provide further context or assumptions for validity.

20 Claims, 17 Drawing Sheets

RAPID RESPONSE REFINEMENT SYSTEM FOR ARTIFICIAL INTELLIGENCE CHAT ENVIRONMENT

BACKGROUND

Various artificial intelligence (AI) tools may be used to generate content (e.g., text, pictures, video, etc.) based on one or more input prompts. The models typically deploy a transformer architecture to generate input embeddings and then decode the embeddings with a decoder. For text, large language models (LLMs) may predict subsequent words or sub-words by using statistical analysis based on training data. In operation, the models may produce the content on a continuous basis as new letters/sub-words/words are predicted. Often, the generated content is provided to users in real or near-real time. However, due to the statistical nature of certain models, such as LLMs, the generated content may suffer from errors, such as hallucinations, that produce content that is incorrect when compared, for example, to source material.

BRIEF DESCRIPTION OF THE DRAWINGS

Various embodiments in accordance with the present disclosure will be described with reference to the drawings, in which.

DETAILED DESCRIPTION

Figure 1:
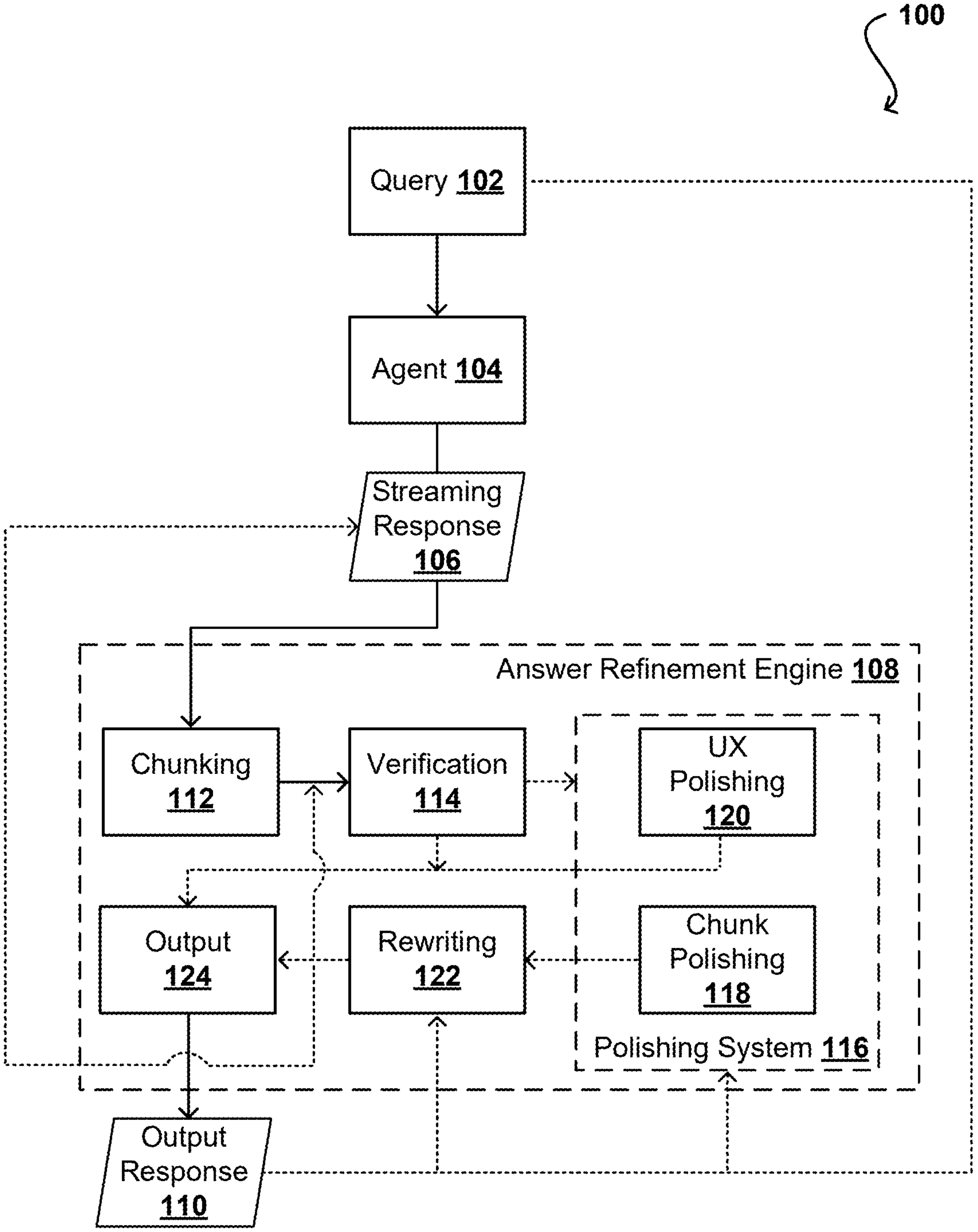
FIG. 1 illustrates an example system for verifying generated content that can be utilized in accordance with various embodiments.

Approaches described and suggested herein relate to systems and methods to detect and mitigate errors (e.g., hallucinations, specifically identified content types, formatting errors, etc.) in real or near real-time (e.g., without significant delay) for generative artificial intelligence (AI) applications. One or more embodiments may implement one or more verification systems to detect errors in portions or chunks of generated content and then optionally correct and/or label likely errors prior to providing a final output response associated with the generated content. In at least one embodiment, embodiments may segment or "chunk" generated content for verification, thereby verifying content as it is generated, instead of waiting to verify entire content segments. One or more embodiments may be used with a generative AI system that produces content as a stream or in segments, such as a large language model (LLM) or other generative AI systems. Content may be buffered until a threshold quantity is obtained and/or a marker indicates that a chunk should be formed, and then the buffered content may be evaluated by one or more verification systems while the remainder of the content is produced by the system. The one or more verification systems may determine whether the content segment is accurate (e.g., the likelihood of hallucination or error is less than a threshold), whether the content segment includes particular types of information (e.g., personally identifiable information (PII), financial information, health information, etc.), and/or the like and then process the content segment according to the determination. In at least one embodiment, content segments determined to be likely hallucinations and/or including certain types of content may be evaluated and then regenerated. In at least one embodiment, content segments determined to not be likely hallucinations and/or determined to not be likely to include certain types of content, but that may otherwise be ambiguous, may be labeled or otherwise provided with an indicator. Furthermore, content segments verified as accurate and/or free of certain types of information may be passed to one or more end users. In this manner, systems and methods may perform content evaluation in real or near-real time and correct likely errors.

One or more embodiments of the present disclosure are directed toward addressing problems associated with generative AI models and hallucinations. For example, generative AI models, such as LLMs, may be used in a wide variety of applications, such as chatbots and other user-facing products and services. During a live conversation, a user may provide an input query and the chatbot may generate an answer. Because LLMs and other generative AI models may be statistical models, output content may be inconsistent across multiple requests and/or may generate content that is not found within or is not accurate when compared to a training dataset or a corpus of information used to generate the content. Embodiments of the present disclosure may implement a systematic verification process in parallel, at least partially, with a two-step answer generation to ensure factual accuracy before providing an output response to a user. In operation, a generative system may receive a query, which is then handled by one or more trained models, such as LLMs, question-answer (QA) models, diffusion models, and/or the like. The models may be referred to as agents for clarity and conciseness. The agent may receive the input and then initiate a streaming process as the answer is generated. For example, the agent may generate content responsive to a text query as a letter by letter response, as a sub-word by sub-word response, as a word by word response, as a phrase by phrase response, and/or the like. While the agent is generating an answer, the output may be buffered and split into chunks, which may be characterized by a defined number of bytes, words, phrases, sentences, characters, and/or the like, as described herein. The chunks may be simultaneously and/or semi-simultaneously sent to one or more verification components, which may include verification systems such as automated reasoning systems, automated fact comparison, and/or the like. The different chunks may be verified and, if it is determined that a likelihood of error exceeds one or more thresholds, the chunk may go through one or more polishing steps. For example, a chunk with a high likelihood of error may be polished and then rewritten to generate the rest of the answer. As another example, a chunk with a lower likelihood of error, but still above an uncertainty threshold, may be annotated by providing one or more indicators in the answer suggesting the likelihood of error and/or assumptions associated with the error. Once the chunk is validated, it may be presented to the user.

Systems and methods of the present disclosure may incorporate an answer refinement engine within an existing content generation pipeline. For example, the answer refinement engine may be used between answer generation and answer presentation in order to evaluate, verify, and then, if necessary, polish, annotate, and/or rewrite answers. In this manner, the likelihood of providing an answer to a user with one or more errors may be reduced. In one or more embodiments, the answer refinement engine may include one or more of a verification engine, a polishing engine, and an answer rewriting engine. The verification engine may be used to verify the factual correctness of each chunk across one or more relevant domains. Verification may be based, at least in part, on a corpus of information for a given domain associated with user input queries, such as content generation systems that implement retrieval augmented generation (RAG). The verification module may make one or more determinations regarding a verification status for a content portion (e.g., chunk), which may indicate a likelihood of error, such as hallucinations. The verification module may further provide suggested corrections or additions responsive to the verification status determination. Additionally, the verification module may also be used to evaluate chunks for certain types of information, such as personal information, financial information, health information, and/or the like. One or more embodiments may also include the polishing engine, which may include two levels or stages of polishing, which may used based, at least in part, on the verification status of a given chunk. For example, a first level of polishing (e.g., chunk polishing) may be used for chunks having a verification status of "invalid" and/or a status corresponding to a likelihood of error that exceeds at least a first threshold. The corrections associated with the first level of polishing may use suggested corrections from the verification module to rewrite (at least partially) the chunk and/or improve the factual accuracy of the chunk. In embodiments where the error is associated with sensitive content in the chunk, the correction may include removing or otherwise obfuscating the sensitive content. A second level of polishing (e.g., user experience (UX) annotating) may be used for chunks having a verification status of "conditionally valid" and/or a status corresponding to a likelihood of error that exceeds at least a second threshold, but does not exceed the first threshold. Instead of rewriting or otherwise changing the content of the chunks, the second level of polishing may modify and/or annotate the chunks to provide one or more indicators or visual alerts that information within the chunks may need additional clarification or verification, such as providing a digital marking/annotations, such as underlining, changing a color of the text, providing an icon, and/or the like. Embodiments of the present disclosure may also incorporate the answer rewriting engine, which may be used with the first level of polishing. After the first level of polishing, the answer rewriting module may be used to complete the answer by generating the remaining portion of the answer based on the polished chunk. In operation, the answer refinement engine may execute for each chunk of an answer, repeating with subsequent chunks in an answer, with each chunk being verified, polished (if necessary), and then incorporated into a final answer delivered to one or more users. In at least one embodiment, chunks are delivered in segments and/or when the chunks are ready and are not held to be fully assembled. That is, chunks may be provided after verification (and if necessary, subsequent polishing/modification) as other chunks of a response are being generated.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an example environment 100 that can be used with embodiments of the present disclosure to verify and refine an answer from one or more content generation systems. In this example, a query 102 is provided to an agent 104, which may be one or more trained generative AI models, such as an LLM, as one non-limiting example. The agent 104 may receive the query 102 and then generate an answer to the query, represented as a streaming response 106. As discussed herein, the agent 104 may produce the answer in real or near-real time, such as by generating individual tokens (e.g., characters, sub-words, words, phrases, etc.) of the answer. The answer may be streamed to one or more users as generated by the agent 104. That is, the individual tokens may be provided upon generation instead of collecting the entirety of the answer prior to providing the answer to the user and/or to one or more intermediate systems. However, generative models are subject to errors, such as hallucinations, inclusion of undesirable content, and/or the like. As discussed herein, hallucinations may refer to a response generated by one or more generative AI systems that is inaccurate/factually incorrect, nonsensical, and/or unrelated to an input prompt, while still being potentially coherent and grammatically correct. In other words, hallucinations may refer to one or more errors within generated content. Certain types of hallucinations may be identifiable, such as factual errors within a generated response. For example, if the query 102 asked the agent 104 to provide the location of the Eiffel Tower, it would be verifiable that the answer should be Paris, France, and therefore, if the agent 104 responded that the Eiffel Tower was in Canberra, Australia, it would indicate that the agent 104 hallucinated the answer. Embodiments of the present disclosure may be used to identify such hallucinations, prior to providing the answer to the end user, and correcting or otherwise indicating likely hallucinations within an answer.

Furthermore, errors may also be defined by one or more users of the system, which may include defined data types that the one or more users do not want included within answers, such as PII, health information, financial information, explicit content, and/or the like. Accordingly, an answer that is generated that includes a home phone number or social security number for a person may be considered an error because the inclusion of PII may be identified as undesirable content. Various embodiments may further use one or more verification systems to correct not only factual accuracies within portions of answers but also to detect the inclusion of undesirable information, which may be tuned based on one or more parameters.

The illustrated embodiment includes an answer refinement engine 108 that may be used to verify one or more portions of the answer (e.g., the streaming response 106) generated by the agent 104 and, based on a verification status, may polish (e.g., change, modify, annotate, etc.) or pass through one or more portions of the answer. Furthermore, the answer refinement engine 108 may verify different portions of the answer in real or near-real time, for example as the answer is being generated as chunks of the streaming response 106, thereby providing verification prior to generating an output response 110.

The answer refinement engine 108 includes a chunking engine 112 that may be used to split or otherwise segment the streaming response 106. The chunking engine 112 may collect portions of the streaming response 106 within a buffer until some threshold or trigger is satisfied. As one non-limiting example, the threshold may be a size (e.g., file size limit, a character limit, etc.) and/or may be based on one or more delimiters. In at least one embodiment, the buffer may collect portions of the streaming response 106 until a target size is reached, such as approximately 300 bytes, as one non-limiting example. However, it should be appreciated that larger or smaller threshold file sizes may be established, such as between 50 bytes and 500 bytes, as one example. The file size limit may be tunable and/or dynamically adjustable, for example based on context or preferences for one or more users. That is, embodiments may use context when generating an answer, rewriting an answer, and/or verifying an answer, and therefore, if the size limit is too small (e.g., smaller than a threshold), then context may be lost. However, if the size limit is too large (e.g., larger than a threshold), then answers may not be effectively chunked and/or latency may be increased. As another example, the threshold may include a character limit or range, such as between approximately 150 to 300 characters. However, the range of characters may also be approximately 50 characters to 1,000 characters. As discussed, smaller character limits may lose context while larger character limits may increase latency. Furthermore, embodiments may include delimiters to generate chunks, such as periods (.), commas (,), semi-colons (;), indications of lists (e.g., bullet points, numbers, etc.), and/or the like. Additionally, embodiments may combine a variety of different methods to tune a desired chunk size, such as imposing one or more of the size limit, the character limit, and/or the delimiters for chunk generation.

Chunks may be produced in real or near-real time by the chunking engine 112 and sent to the verification engine 114 for verification and analysis. As discussed herein, verification may include, at least in part, analysis of chunks for factual errors and/or for inclusion of content in accordance with one or more parameters. In one or more embodiments, chunks may be processed by the verification engine 114 in parallel, or at least partially in parallel, but ordering may be maintained. That is, if verification of a second chunk is complete before a first chunk, the second chunk will not be sent for further processing ahead of the first chunk. The verification engine 114 may include one or more components to evaluate one or more portions of the chunks to evaluate accuracy and/or a likelihood of error (e.g., hallucination), which may include generating a verification status. The verification engine 114 may include a variety of different verification components, such as domain-specific verification components, which may be accessible using one or more networks, as discussed herein. For example, a verification component may provide fact-checking, such as by comparing text strings to a source document. Additionally, the verification engine 114 may also include one or more components to evaluate one or more portions of the chunks to identify particular types of information, which may be based on one or more rules or a user-defined list. Identification of such components may be deemed an error, which may also be accompanied by a verification status.

The verification engine 114 may be used to generate a verification status, which may include status identifiers such as "INVALID" and/or "CONDITIONALLY VALID", with further identifiers such as "YES" or "NO" for a given state. For example, the process may include a two-step verification status where first the chunk is evaluated for validity, where the designation for INVALID is provided as either YES or NO. If YES, as discussed herein, further processing may be performed. If NO, as also discussed herein, another status evaluation for CONDITIONALLY VALID may be performed, with additional designations of YES or NO. In this manner, different levels of polishing may be applied to chunks based on different status designations.

In at least one embodiment, the verification engine 114 may determine that a chunk is at least one of INVALID or CONDITIONALLY VALID and use a polishing system 116 to modify and/or rewrite the chunk, and in certain embodiments, the remainder of the answer. The polishing system 116 may include different sub-components, which may be used in accordance with different status identifications of the chunks. As an example, INVALID chunks may be processed by the chunk polishing engine 118, while CONDITIONALLY INVALID chunks may be processed by the UX polishing engine 120. As discussed herein, the chunk polishing engine 118 may use information from the verification engine 114, such as suggestions for modifications to the chunk, and provide a refined chunk to a rewriting engine 122 (e.g., an answer rewriting engine). The rewriting engine 122 may generate a new chunk, which may then be provided to an output engine 124, which may apply one or more preferences or modifications, before providing the output response 110. Furthermore, the polished chunk may also be provided back to the stream in order to continue generating the answer, as discussed in more detail herein. In at least one embodiment, the CONDITIONALLY VALID chunks may be processed by the UX polishing engine 120 prior to forwarding to the output engine 124 for generation of the output response 110. The UX polishing engine 120 may modify, annotate, and/or otherwise add one or more features to the chunk indicative of an alert or other notification to the user that one or more portions of the chunk should be verified and/or evaluated with additional sources. For example, the UX polishing engine 120 may add an underline to a portion of the chunk or may apply a hyperlink to the chunk linking to a document with additional information. Additionally, in at least one embodiment, the UX polishing engine 120 may modify the output in order to explain assumptions or other information used to generate the chunk. Accordingly, systems and methods may apply an in-stream verification and modification service to evaluate generated content prior to providing the output response 110.

Figure 2A:
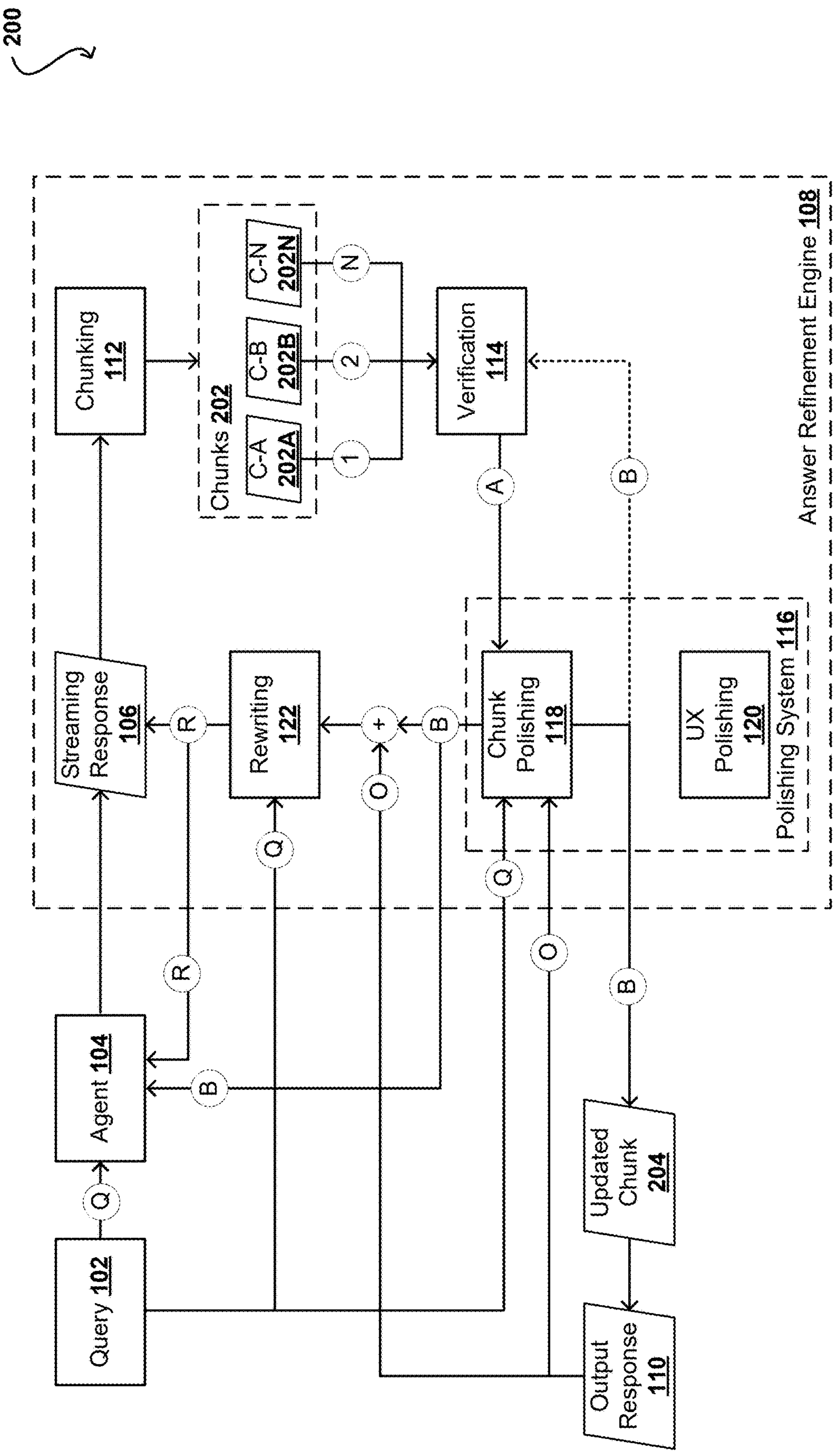
FIG. 2A illustrates an example system for verifying and updating invalid content that can be utilized in accordance with various embodiments.

FIG. 2A illustrates an environment 200 that may be used with embodiments of the present disclosure. In this example, the verification engine 114 may determine that one or more chunks are invalid, and therefore, my follow a processing pipeline to polish the one or more chunks prior to providing the output response 110. The query 102 may be provided to the agent 104, as shown by the indication of Q, which may be one or more generative AI systems, such as an LLM executing one or more portions of a chatbot, as one non-limiting example. The agent 104 may be interacting with a user in real or near-real time, and therefore, may provide portions of an answer as the portions are generated, for example as the streaming response 106. By way of example, responsive to the query 102, the agent 104 may generate an answer that is provided by character, sub-word, word, and/or the like. As the content is generated as the streaming response 106, the chunking engine 112 may generate one or more chunks 202, which may include portions of the answer.

As discussed herein, the chunks 202 may be generated based on one or more rules or parameters for splitting the answer into verifiable components. The streaming response 106 may be fed into a buffer that may use one or more rules to determine how to generate a chunk. As one example, the chunking engine 112 may evaluate a number of characters in the buffer and determine a threshold number has been reached, which may cause the generation of a chunk. In certain embodiments, the number of characters may be used as a threshold with an additional range to prevent splitting chunks in the middle of words. The number of characters may be any reasonable number, such as between approximately 150 and 200 characters as one non-limiting example. As another non-limiting example, the buffer may be evaluated based on size (e.g., disk size) of approximately 300 bytes. As a further example, the size of the buffer may be disregarded and the context of the buffer may be used, such as specific delimiters, such as periods or other punctuation. A set of rules may be established that provides a hierarchy to combine the use of different buffer size, and therefore chunk size, analysis. Such as a first rule that evaluates based on delimiters up to a certain character count number. In this manner, the chunks 202 may be generated with a variety of sizes based on one or more desired characteristics.

In one or more embodiments, the size of the chunks may be tuned or particularly selected to balance latency, context, and/or the like. Different chunk sizes may be associated with different domains and/or restrictions. For example, because the system executes in real or near-real time, latency may be based on one or more targets, such as time to first byte, time to last byte, time between chunks, and others. The size of the chunks may be particularly selected to not increase the time to first byte more than some percentage of the system without the use of the answer refinement engine 108. In some embodiments, the size of the chunks may dynamically change within a session depending on the expected time of output and/or processing (e.g., increase or decrease the chunk size in a session based on a projected time to first byte, time last byte, or time between chunks, based on the current operating condition/efficiency). For example, after a session has experienced multiple iterations of query to answer, chunk size may decrease corresponding to a confined response scenario. In some embodiments, if average latency for time to first byte was approximately 7 seconds, then the chunk size may be selected such that latency for time to first byte is approximately 8 or 9 seconds, representing an additional 1 or 2 seconds (e.g., approximately 15 percent to 30 percent increase). Additionally, if a target latency for time to first byte was 2.5 seconds, then the chunk size may be selected such that the latency for time to first byte did not exceed the target latency. As another example, latency may be evaluated in terms of time to last byte. In one or more embodiments, users may tolerate additional latencies (e.g., approximately 70 percent to 100 percent increases) for time to last byte due to the improved quality of answers provided by using the answer refinement engine 108. As a further example, the sizes of the chunks may be selected based on a target maximum latency (e.g., one or more thresholds) for one or more portions of the system, such as a maximum latency between chunks, which may be approximately 1 second.

Block size determination/selection is not an arbitrary design element, embodiments of the present disclosure account for the use environment expectation, current system load, domain complexity, and/or service level agreements when tuning the block size to achieve optimal latency (e.g., an AI chatbot in a domain-specific environment such as personal banking may start with larger chunk sizes because of a more confined verification environment while an AI chatbot in returning article translations may use smaller chunk sizes to quickly provide initial translations). In one or more embodiments, systems and methods of the present disclosure may dynamically select one or more chunk byte sizes to enable at least one of a time to display for a first byte of a final output to be less than 2.5 seconds from the time the query is received and/or a time to categorize a chunk into valid, invalid, or conditionally valid is less than 1 second. However, various embodiments may also dynamically select one or more chunk byte sizes to enable at least one of a time to display for a first byte of a final output to be less than 7 seconds from the time the query is received and/or a time to categorize a chunk into valid, invalid, or conditionally valid is less than 3 seconds. Furthermore, various embodiments may also dynamically select one or more chunk byte sizes to enable at least one of a time to display for a first byte of a final output to be less than 10 seconds from the time the query is received and/or a time to categorize a chunk into valid, invalid, or conditionally valid is less than 5 seconds. In this manner, latency may be defined as a hard constraint to cause the system to adjust the block size (dynamically in a session or statically to a particular job) to meet the latency expectation.

Any reasonable number of chunks 202 may be generated, with longer answers likely having more chunks 202. The illustrated example includes the chunks 202A-202N. The chunks 202 may be fed into the verification engine 114, as illustrated by the labels 1, 2, and N, which may be performed in parallel or at least partially in parallel. For example, the chunk C-A 202A may be generated before the chunk C-B 202B, and therefore may begin evaluation at the verification engine 114 before the chunk C-B 202B, but the chunk C-B 202B may begin evaluation before the evaluation of the chunk C-A 202A is complete. The ordering of the chunks 202, however, may be maintained to ensure that the answer logically makes sense. For example, if the evaluation of the chunk C-B 202B was completed prior to the evaluation of the chunk C-A 202A, chunk C-B 202B would be held for further processing until chunk C-A 202A was complete and subsequently processed.

In this example, the verification engine 114 may determine that one or more of the chunks 202A-202N are invalid, and therefore, may forward the invalid chunk 202 to the chunk polishing engine 118, as illustrated by the label A. The verification engine 114 may also provide recommended changes for improving or changing the associated invalid chunk. The chunk polishing engine 118 may change and/or modify the chunk and generate an updated chunk 204 to output as the output response 110, as illustrated by the label B. Additionally, in one or more embodiments, the updated chunk may be verified again, such as by using the verification engine 114, prior to providing the updated chunk 204 as at least a portion of the output response 110. For example, the updated chunk 204 may be evaluated and a validity status may be determined for the updated chunk 204. If the updated chunk was determined to not be INVALID, then the updated chunk 204 would be provided as at least a portion of the output response 110, for example if the updated chunk was not deemed CONDITIONALLY VALID, as discussed herein. Additionally, in one or more embodiments, the verification engine 114 may also, or alternatively, determine whether one or more of the chunks 202A-202N are valid. If a chunk of the one or more chunks is determined to be valid, then the chunk may bypass additional processing with respect to conditional validity and may instead be passed as at least a portion of the output response 110, as also discussed herein. However, if the updated chunk 204 were still invalid, further polishing and refinement could be performed. In certain embodiments, there may be a limit or other threshold for the amount of verification associated with updated chunks 204. For example, additional validation may be skipped if the threshold latency for the system, or one or more target latencies, would exceed a threshold. Additionally, a number of times a chunk or updated chunk is verified may be limited by one or more thresholds. In at least one embodiment, the chunk polishing engine 118 uses context to generate the updated chunk. For example, previously provided output responses 110, illustrated by the label O (if available), and the query 102, illustrated by the label Q, may be used by the chunk polishing engine 118 to generate the updated chunk 204.

In one or more embodiments, the updated chunk 204 may be at a beginning, intermediate, or end portion of the answer. If the updated chunk 204 is at an end portion of the answer, then additional processing may not be used. However, if the updated chunk 204 is part of the beginning or intermediate portion of the answer, the updated chunk 204 may be used to generate the remainder of the answer. For example, the updated chunk 204, illustrated by the label B, along with the previously provided output response 110, illustrated by the label O, and the query 102, illustrated by the label Q, may be provided to the rewriting engine 122, and in certain embodiments to the agent 104, to generate a rewritten answer, as illustrated by the label R, which may then be provided back to the agent 104 and/or be included or substituted as part of the streaming response 106. In this manner, the updated chunk 204 and previous context may be used to update the answer. Furthermore, in one or more embodiments, the updated chunk 204, shown by the label B, is also provided to the agent 104, which may be part of an informational feedback loop to alert the agent 104 that an INVALID response was generated.

The illustrated example includes the chunks 202, shown as the chunk C-A 202A, the chunk C-B 202B, and the chunk C-N, 202N. If the chunk C-A 202A was analyzed along the pathway labeled A, then the subsequent chunks C-B 202B and C-B 202N would be discarded because the updated chunk 204 would be used to generate the remainder of the portion. That is, if the chunk C-A 202A was invalid, such as by including a hallucination, it may be likely that subsequent chunks also included hallucinations, and therefore, regenerating the remainder the answer may provide an answer with greater accuracy. Similarly, if the chunk C-B 202B was analyzed along the pathway labeled A, then the subsequent chunk C-B 202N would be discarded, but the chunk C-A 202A would already be output to the user as part of the answer, and therefore, would not undergo further processing. Accordingly, systems and methods of the present disclosure may use updated chunks to update a context of an answer and reformulate the remainder of the answer.

Figure 2B:
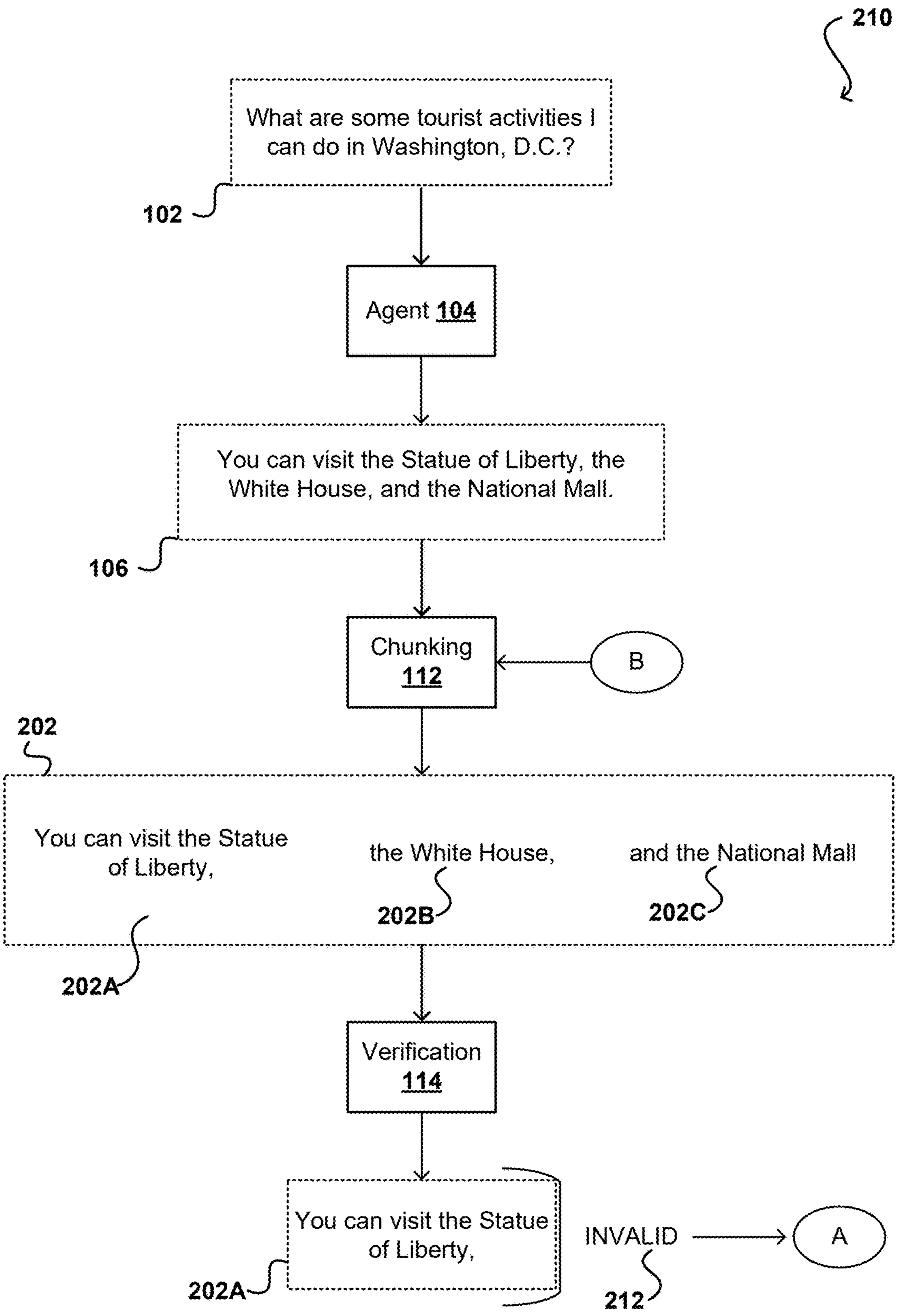
FIG. 2B illustrates a representation for verifying generated content that can be utilized in accordance with various embodiments.
Figure 2C:
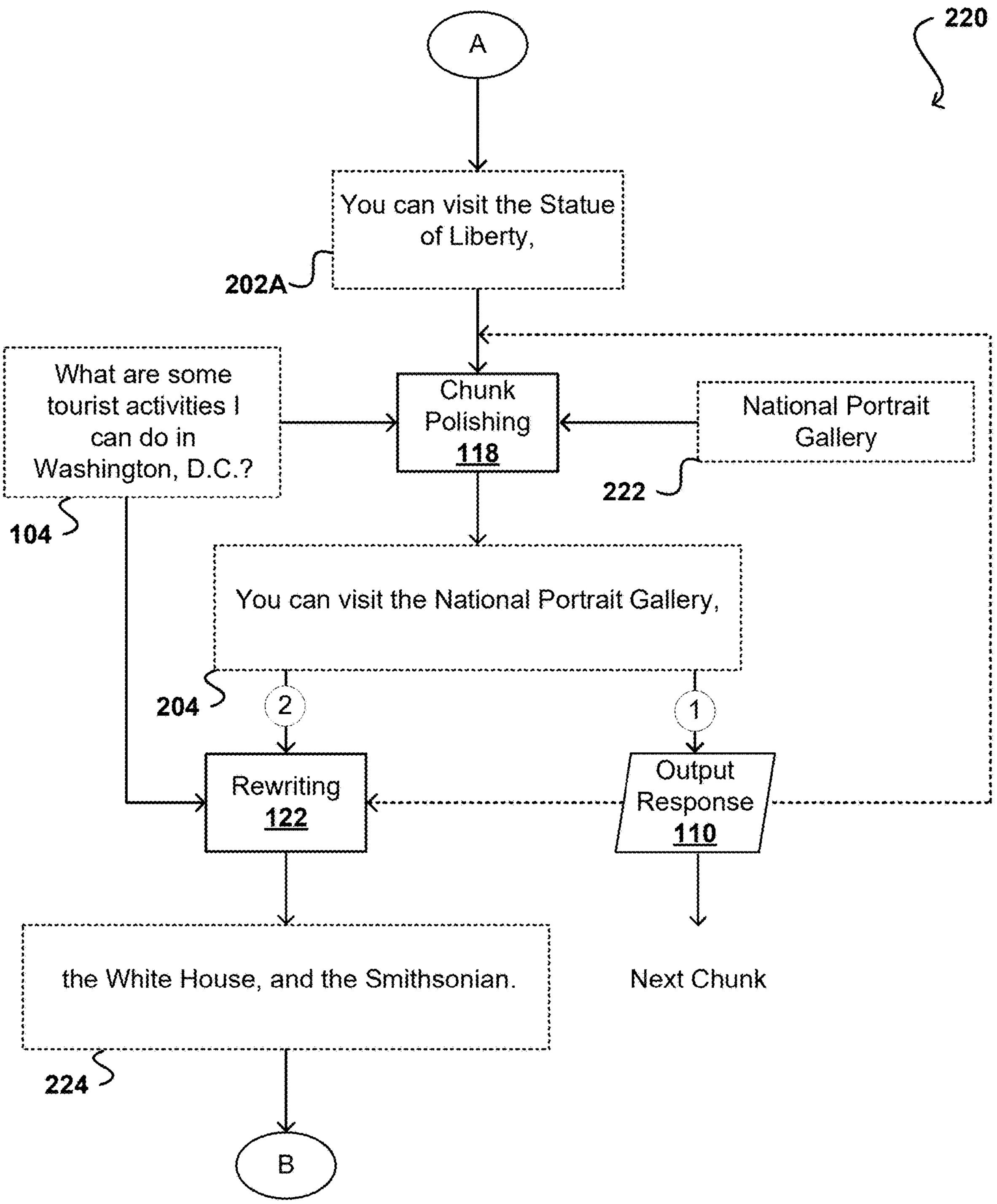
FIG. 2C illustrates a representation for updating invalid generated content that can be utilized in accordance with various embodiments.

FIGS. 2B and 2C illustrate schematic representations 210, 220 that may be used with embodiments of the present disclosure. In this example, the query 102 is provided to the agent 104, for example as part of a chatbot service, with the agent being one or more generative AI models to produce an answer to the query 102 in the form of the output response 110. The query 102 asks the agent 104 "What are some tourist activities I can do in Washington, D.C.?" and the agent 104 may begin to generate the streamed response 106. As shown, the streamed response is provided to the chunking engine 112, which may evaluate a buffer to generate the chunks 202. In this example, one or more delimiters may be used, along with context, to generate the chunks 202, such as commas. For example, the streaming response 106 indicates that "You can visit the Statue of Liberty, the White House, and the National Mall." The commas may enable the chunking engine 112 to break up the streaming response 106 into the three chunks 202A, 202B, and 202C. Each of these chunks 202A-202C may be passed to the verification engine 114 to evaluate the accuracy of the chunks 202A-202C.

In one or more embodiments, verification may be performed at least partially in parallel. However, the ordering and structure may be maintained between chunks 202 for context and clarity. The first chunk 202A is evaluated and a verification status 212 is set to INVALID because the Statue of Liberty is not in Washington, D.C. As a result, as shown in the continued representation 220 in FIG. 2C, the chunk 202A is passed to the chunk polishing engine 118, along with the query 102, a recommendation 222 from the verification engine 114 and/or one or more additional models, and, if available, previous chunks of the output response 110 provided to the user. The chunk polishing engine 118 may then generate the updated chunk 204, which in this example uses the recommendation 222 to replace "Statue of Liberty" with "National Portrait Gallery." As a result, the updated chunk 204 may be passed as part of the output response 110, as shown by the numeral 1.

Furthermore, in this example, there were additional chunks 202B, 202C as part of the streaming response 106. However, because these additional chunks 202B, 202C are after an invalid chunk, the additional chunks 202B, 202C are discarded and the updated chunk 204 may be passed to the rewriting engine 122, along with the query 102 and, if available, previous chunks from the output response 110, in order to rewrite and generate an updated answer 224, which may then subsequently be chunked and verified. In this manner, the initial query 102 may be answered with each chunk of the answer being verified prior to providing the answer to the user.

Figure 3A:
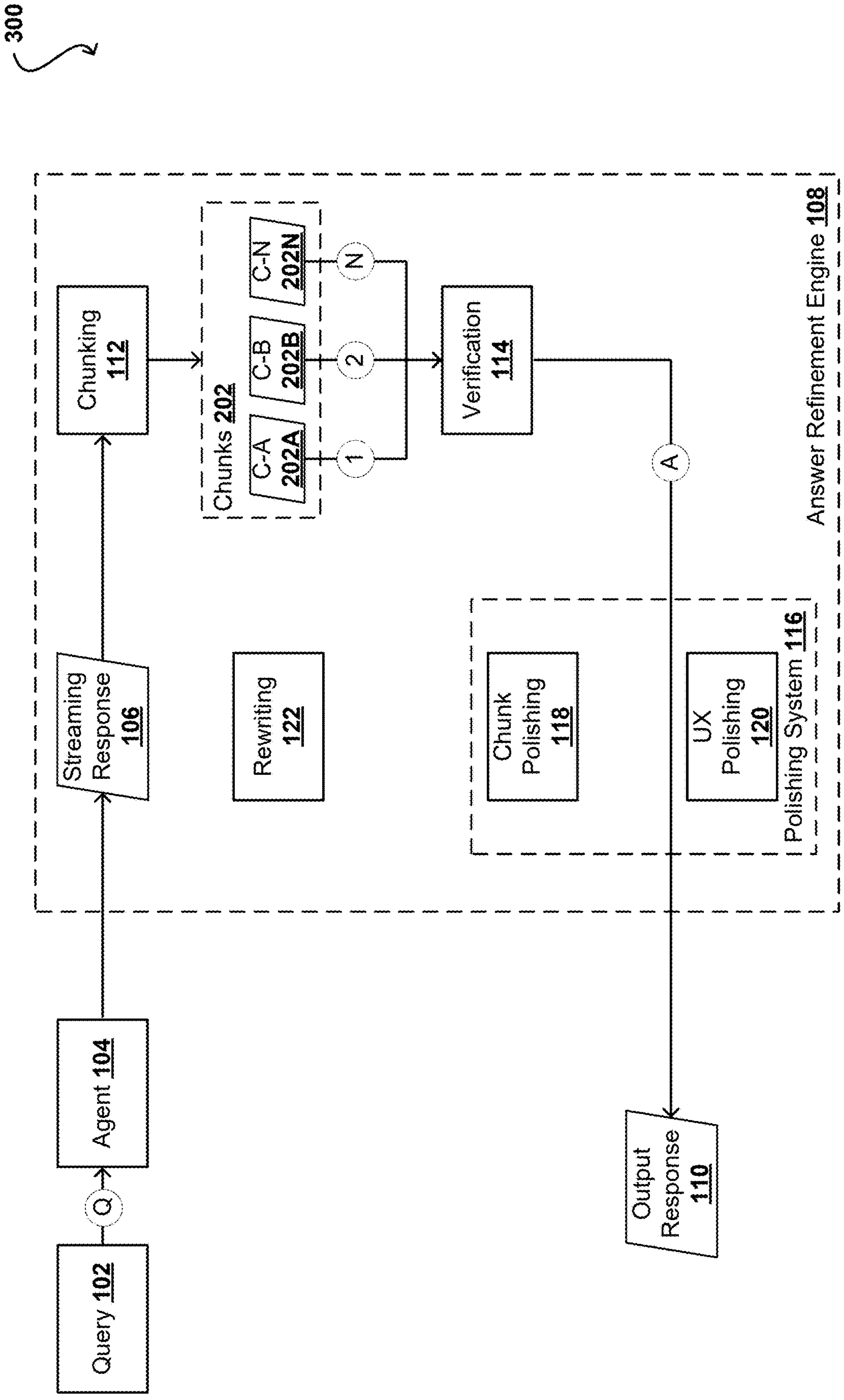
FIG. 3A illustrates an example system for verifying generated content that can be utilized in accordance with various embodiments.

FIG. 3A illustrates an environment 300 that may be used with embodiments of the present disclosure. In this example, the verification engine 114 may determine that one or more chunks are valid (e.g., INVALID—NO) and further that the one or more chunks are not conditionally valid (e.g., CONDITIONALLY VALID—NO). Accordingly, the polishing system 116 may be bypassed and the chunk may be provided as part of the output response 110. As discussed with respect to FIG. 2A, the query 102 may be provided to the agent 104, as shown by the indication of Q, which may be one or more generative AI systems, such as an LLM executing one or more portions of a chatbot, as one non-limiting example. The agent 104 may be interacting with a user in real or near-real time, and therefore, may provide portions of an answer as they are generated, for example as the streaming response 106. As the content is generated as the streaming response 106, the chunking engine 112 may generate one or more chunks 202, which may include portions of the answer.

As discussed herein, the chunks 202 may be generated based on one or more rules or parameters for splitting the answer into actionable components. These rules may be based on chunk sizes, content of the chunks, and/or combinations thereof. Furthermore, different rules may be applied to different domains and/or for different use cases and/or environments.

Any reasonable number of chunks 202 may be generated, with longer answers likely having more chunks 202. The illustrated example includes the chunks 202A-202N. The chunks 202 may be fed into the verification engine 114, as illustrated by the labels 1, 2, and N, which may be performed in parallel or at least partially in parallel.

In this example, the verification engine 114 may determine that one or more of the chunks 202A-202N are not invalid (e.g., the verification status is INVALID—NO), and therefore, may make a secondary determination regarding whether or not the chunk is conditionally valid. For example, a chunk may include some ambiguity, such as a condition in which it is valid, but where additional context or information may be needed in order to specify the condition. In this example, there may be no ambiguity and the verification status may note that the chunk is not conditionally valid (e.g., verification status is CONDITIONALLY VALID—NO), and as a result, no additional processing may be performed on the chunk using the answer refinement engine 108. Accordingly, the chunk may be provided as part of the output response 110.

Additionally, or alternatively, in at least one embodiment, the verification engine 114 may determine one or more of the chunks 202A-202N are valid (e.g., VALID—YES), as a result, there may not be further evaluation regarding conditional validity. Accordingly, the polishing system 116 may be bypassed and the chunk may be provided as part of the output response 110.

Figure 3B:
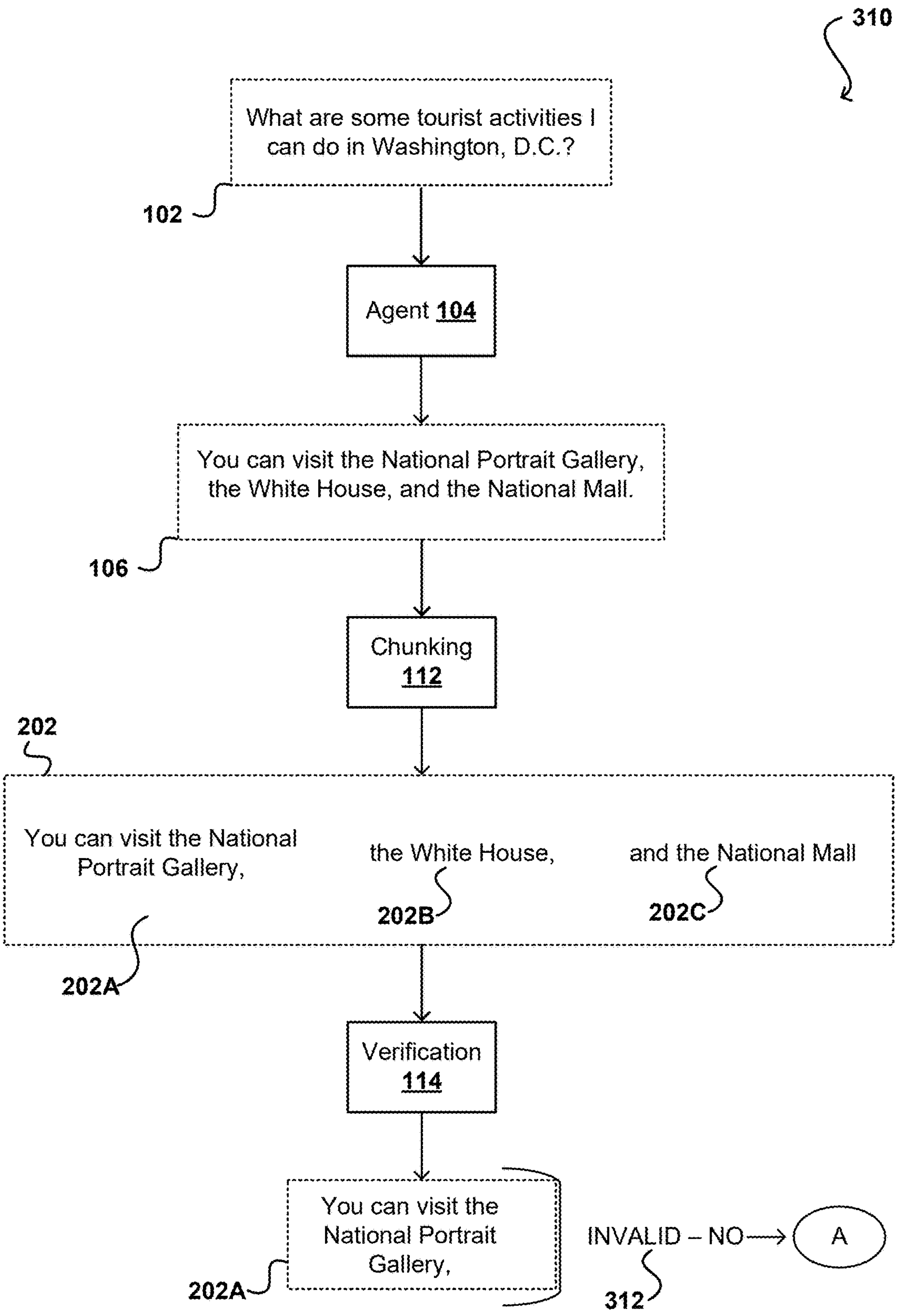
FIG. 3B illustrates a representation for verifying generated content that can be utilized in accordance with various embodiments.
Figure 3C:
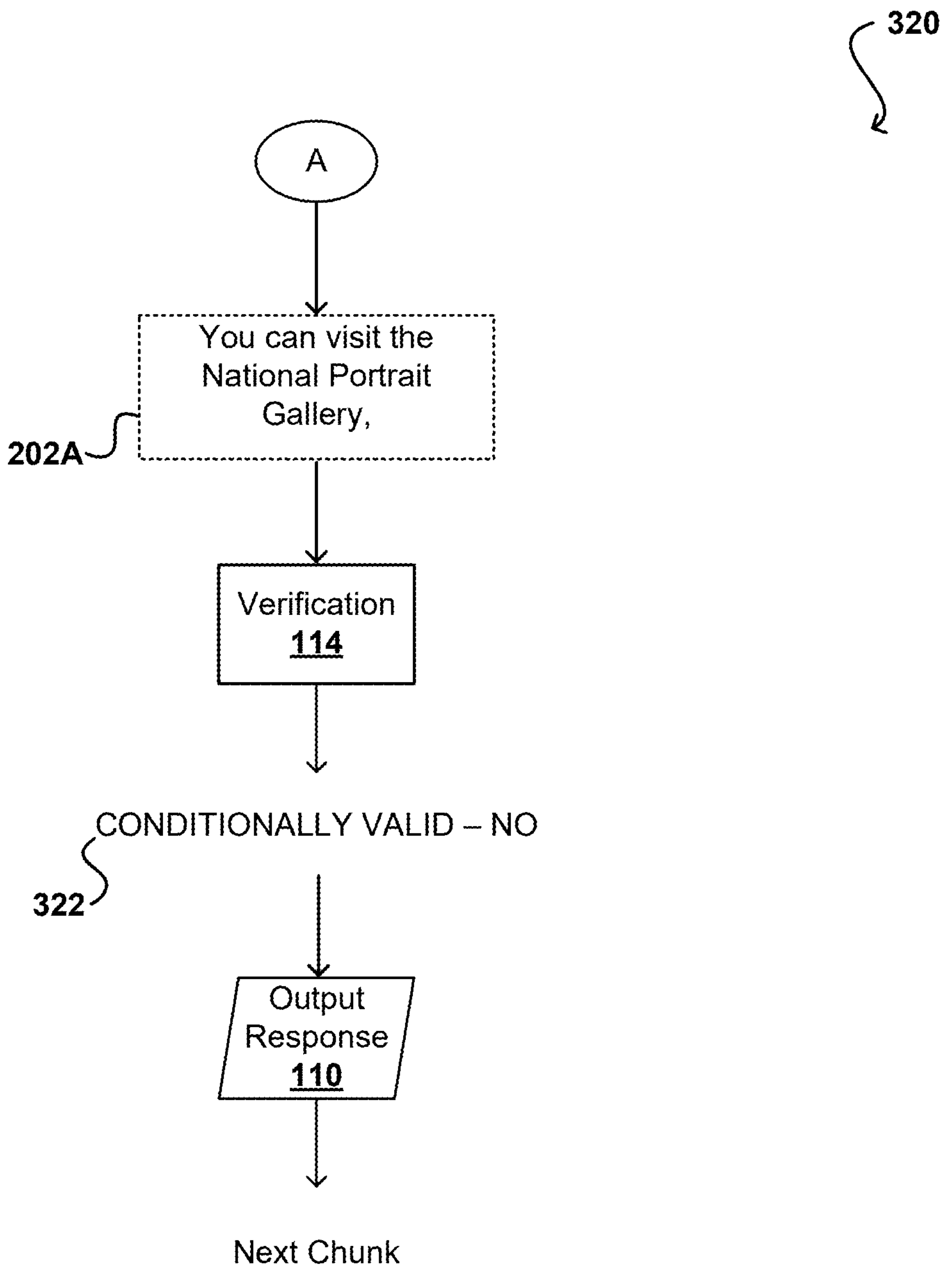
FIG. 3C illustrates a representation for verifying generated content that can be utilized in accordance with various embodiments.

FIGS. 3B and 3C illustrate schematic representations 310, 320 that may be used with embodiments of the present disclosure. In this example, similar to the example of FIGS. 2B and 2C, the query 102 is provided to the agent 104, for example as part of a chatbot service. The query 102 asks the agent 104 "What are some tourist activities I can do in Washington, D.C?" and the agent 104 may begin to generate the streamed response 106. As shown, the streamed response is provided to the chunking engine 112, which may evaluate a buffer to being to generate the chunks 202. In this example, one or more delimiters may be used, along with context, to generate the chunks 202, such as commas. For example, the streaming response 106 indicates that "You can visit the National Portrait Gallery, the White House, and the National Mall." The commas may enable the chunking engine 112 to break up the streaming response 106 into the three chunks 202A, 202B, and 202C. Each of these chunks 202A-202C is passed to the verification engine 114 to evaluate the accuracy of the chunks 202A-202C.

In one or more embodiments, verification may be performed at least partially in parallel. However, the ordering and structure may be maintained between chunks 202 for context and clarity. The first chunk 202A is evaluated and a verification status 312 is set to INVALID—NO because the National Portrait Gallery is an option for tourist visits in Washington, D.C. As a result, as shown in the continued representation 320 in FIG. 3C, the chunk 202A is further processed by the verification engine 114 to determine whether the chunk 202A is conditionally valid. In this instance, it is determined that a second verification status 322 is set to CONDITIONALLY VALID—NO, indicating that the chunk 202A may be passed to the output response 110 without further modification by the answer refinement engine 108.

Figure 4A:
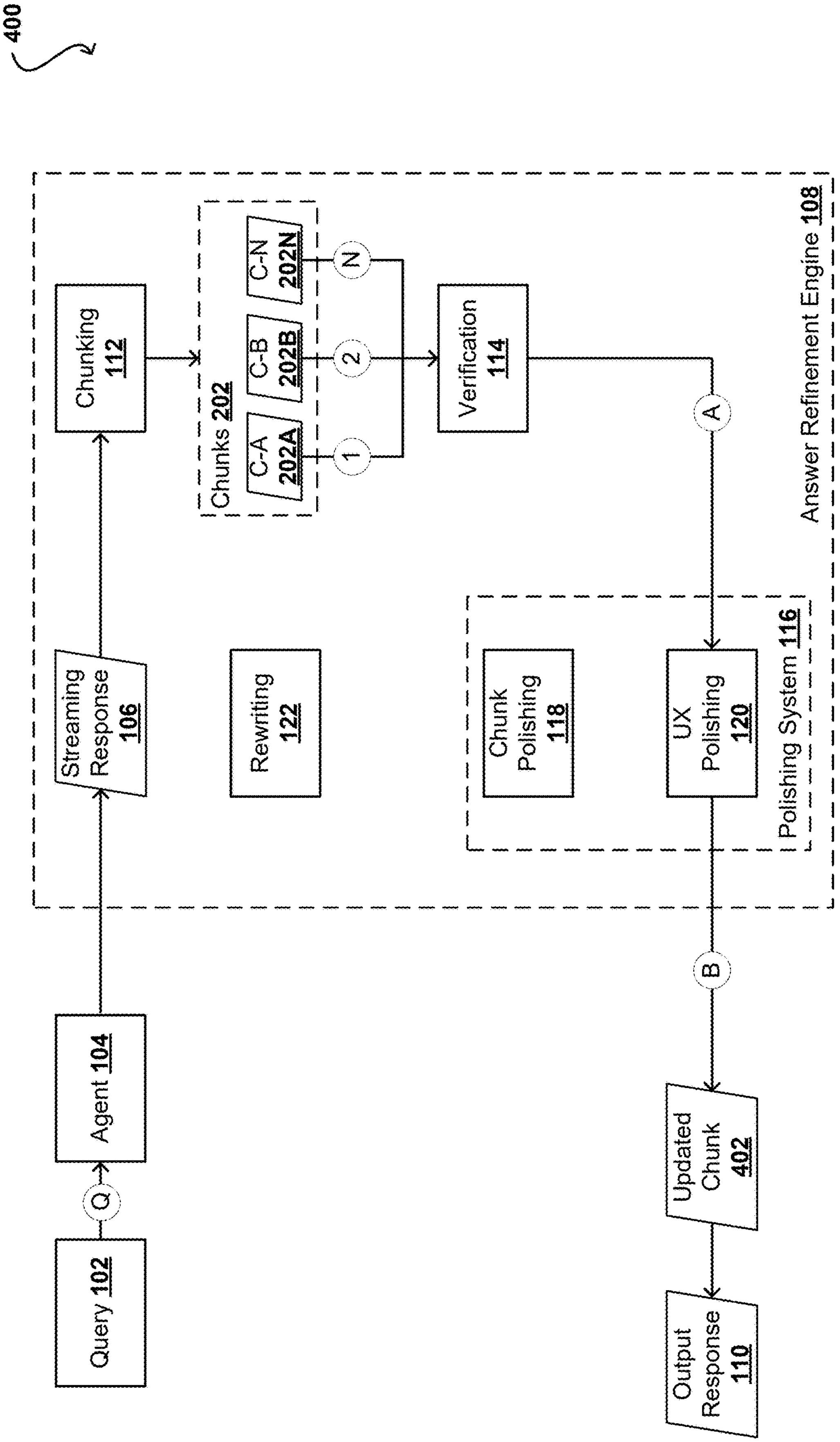
FIG. 4A illustrates an example system for verifying and updating conditionally valid content that can be utilized in accordance with various embodiments.

FIG. 4A illustrates an environment 400 that may be used with embodiments of the present disclosure. In this example, the verification engine 114 may determine that one or more chunks are valid (e.g., INVALID—NO) and further that the one or more chunks are conditionally valid (e.g., CONDITIONALLY VALID—YES). Accordingly, the polishing system 116 may be used to generate an updated chunk 402, for example using the UX polishing engine 120. As discussed with respect to FIGS. 2A and 3A, the query 102 may be provided to the agent 104, as shown by the indication of Q, which may be one or more generative AI systems, such as an LLM executing one or more portions of a chatbot, as one non-limiting example. The agent 104 may be interacting with a user in real or near-real time, and therefore, may provide portions of an answer as they are generated, for example as the streaming response 106. As the content is generated as the streaming response 106, the chunking engine 112 may generate one or more chunks 202, which may include portions of the answer.

As discussed herein, the chunks 202 may be generated based on one or more rules or parameters for splitting the answer into actionable components. These rules may be based on chunk sizes, content of the chunks, and/or combinations thereof. Furthermore, different rules may be applied to different domains and/or for different use cases and/or environments. Any reasonable number of chunks 202 may be generated, with longer answers likely having more chunks 202. The illustrated example includes the chunks 202A-202N. The chunks 202 may be fed into the verification engine 114, as illustrated by the labels 1, 2, and N, which may be performed in parallel or at least partially in parallel.

In this example, the verification engine 114 may determine that one or more of the chunks 202A-202N are not invalid (e.g., the verification status is INVALID—NO), and therefore, may make a secondary determination regarding whether or not the chunk is conditionally valid. For example, chunks may include some ambiguity, such as a condition in which it is valid, but where additional context or information may be needed in order to specify the condition. In this example, there may be ambiguity and the verification status may note that the chunk is conditionally valid (e.g., verification status is CONDITIONALLY VALID—YES), and as a result, additional processing may be performed on the chunk using the UX polishing engine

120. In this example, the conditionally valid chunk is provided to the UX polishing engine 120, as shown by the indication A, for further processing/evaluation. For example, the UX polishing engine 120 may incorporate a marker or other identifying information associated with the ambiguities present in the associated chunk. By way of example, the UX polishing engine 120 may be used to provide context for the chunk, such as providing information of when the chunk is valid or not.

In at least one embodiment, the UX polishing engine 120 may annotate the chunk, for example, by adding an interactive element to the chunk. For example, a portion of the chunk may be underlined, which may provide a link or other pop-up to the user that, when the user clicks on the portion or otherwise interacts with the portion, additional context for the answer is provided. Additionally, other graphical or interactive adjustments may be added, such as changing a color of the text that is associated with the ambiguity, providing a marking or indicator, and/or combinations thereof. The addition of the interactive element may be used to form the updated chunk 402, which may then be provided as at least a portion of the output response 110. However, in certain embodiments, the UX polishing engine 120 may rewrite the chunk or otherwise annotate the chunk in order to directly incorporate the assumptions into the updated chunk instead of providing links or other interactive elements. In this manner, additional context may be included within chunks to provide an improved user experience.

Figure 4B:
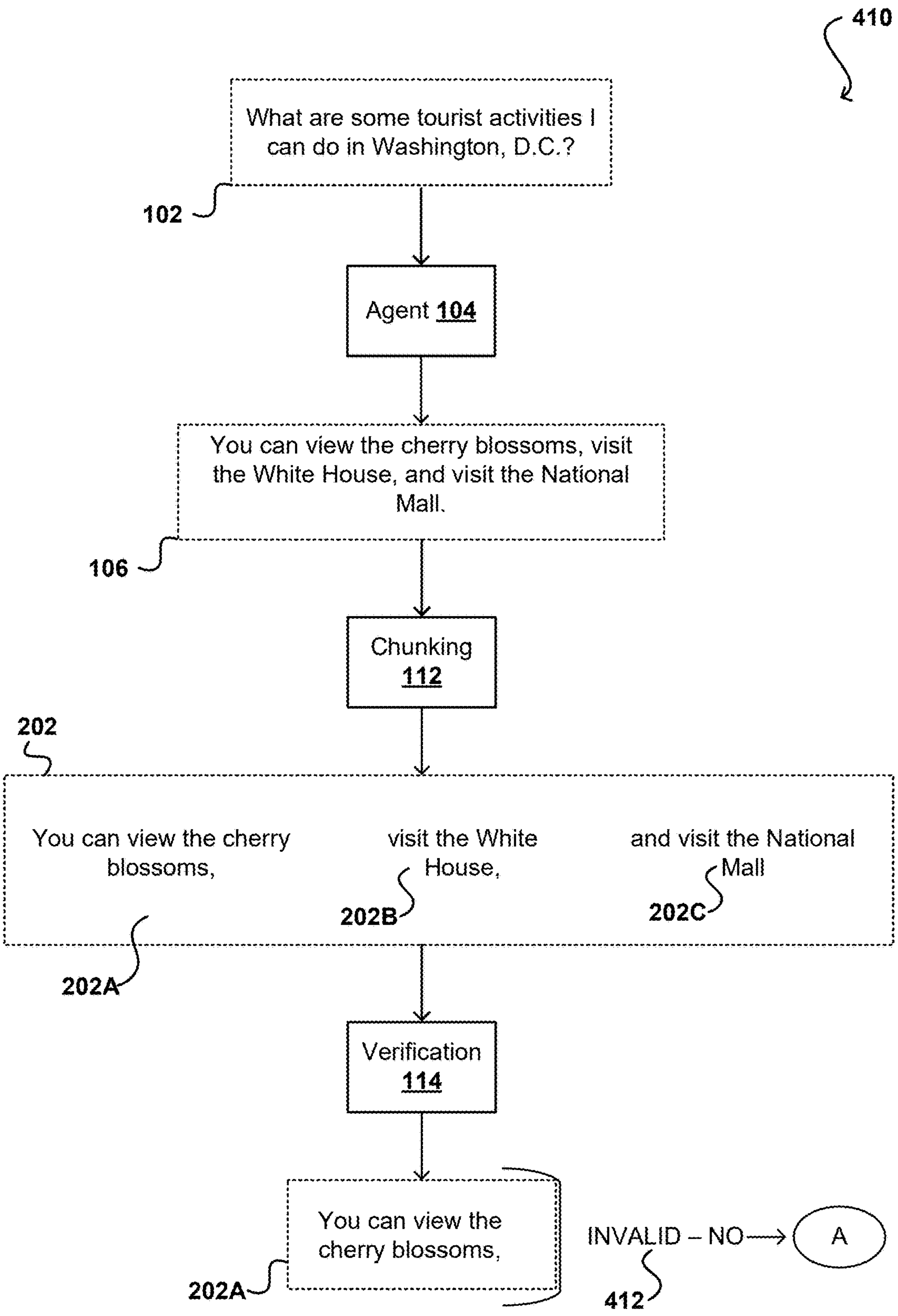
FIG. 4B illustrates a representation for verifying generated content that can be utilized in accordance with various embodiments.
Figure 4C:
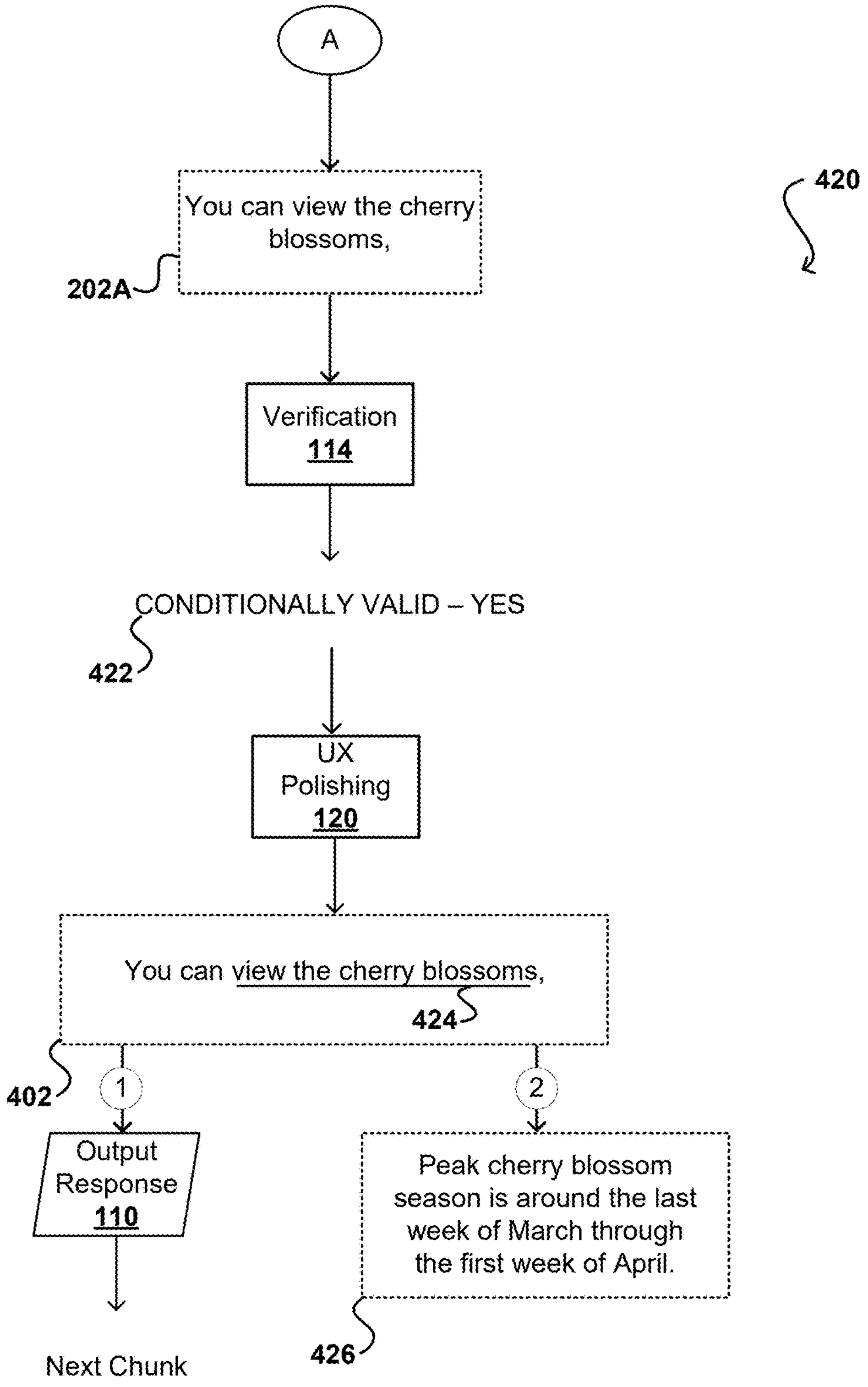
FIG. 4C illustrates a representation for updating conditionally valid generated content that can be utilized in accordance with various embodiments.

FIGS. 4B and 4C illustrate schematic representations 410, 420 that may be used with embodiments of the present disclosure. In this example, similar to the example of FIGS. 2B, 2C, 3B, and 3C, the query 102 is provided to the agent 104. The query 102 asks the agent 104 "What are some tourist activities I can do in Washington, D.C?" and the agent 104 may begin to generate the streamed response 106. As shown, the streamed response is provided to the chunking engine 112, which may evaluate a buffer to generate the chunks 202. In this example, one or more delimiters may be used, along with context, to generate the chunks 202, such as commas. For example, the streaming response 106 indicates that "You can view the cherry blossoms, visit the White House, and visit the National Mall." The commas may enable the chunking engine 112 to break up the streaming response 106 into the three chunks 202A, 202B, and 202C. Each of these chunks 202A-202C is passed to the verification engine 114 to evaluate the accuracy of the chunks 202A-202C.

In one or more embodiments, verification may be performed at least partially in parallel. However, the ordering and structure may be maintained between chunks 202 for context and clarity. The first chunk 202A is evaluated and a verification status 412 is set to INVALID—NO because cherry blossom viewing is a known option for tourist visits in Washington, D.C. As a result, as shown in the continued representation 420 in FIG. 4C, the chunk 202A is further processed by the verification engine 114 to determine whether the chunk 202A is conditionally valid. In this instance, it is determined that a second verification status 422 is set to CONDITIONALLY VALID—YES, indicating that the chunk 202A may be valid in certain circumstances, but may not be valid in others, and therefore additional context or information would improve the answer. As a result, the UX polishing engine 120 may receive the chunk 202A and apply one or more modifications (e.g., annotations, additional content, etc.) to the chunk 202A to generate the updated chunk 402. In this example, a visual indicator 424 is added in the updated chunk 402 to illustrate the portion of the updated chunk 402 that would benefit from or would provide more information to an interested user. As a result, the updated chunk 402 may be passed as part of the output response 110, as shown by the numeral 1. Further illustrated as numeral 2 is additional information 426 provided upon interaction with the visual indicator 424. Here, the timing for cherry blossom season is provided so that an interested user would be able to determine whether their anticipated visit coincided with the suggested activity. The additional information 426 may be generated as part of the verification engine 114 and/or may be provided from one or more additional models. For example, one or more additional models may be associated with the verification engine 114 to provide recommendations and/or assumptions following a signal indicative of a particular status (e.g., INVALID or CONDITIONALLY VALID). Accordingly, embodiments may be used to supplement and enhance the answers generated responsive to the query 102.

Figure 5A:
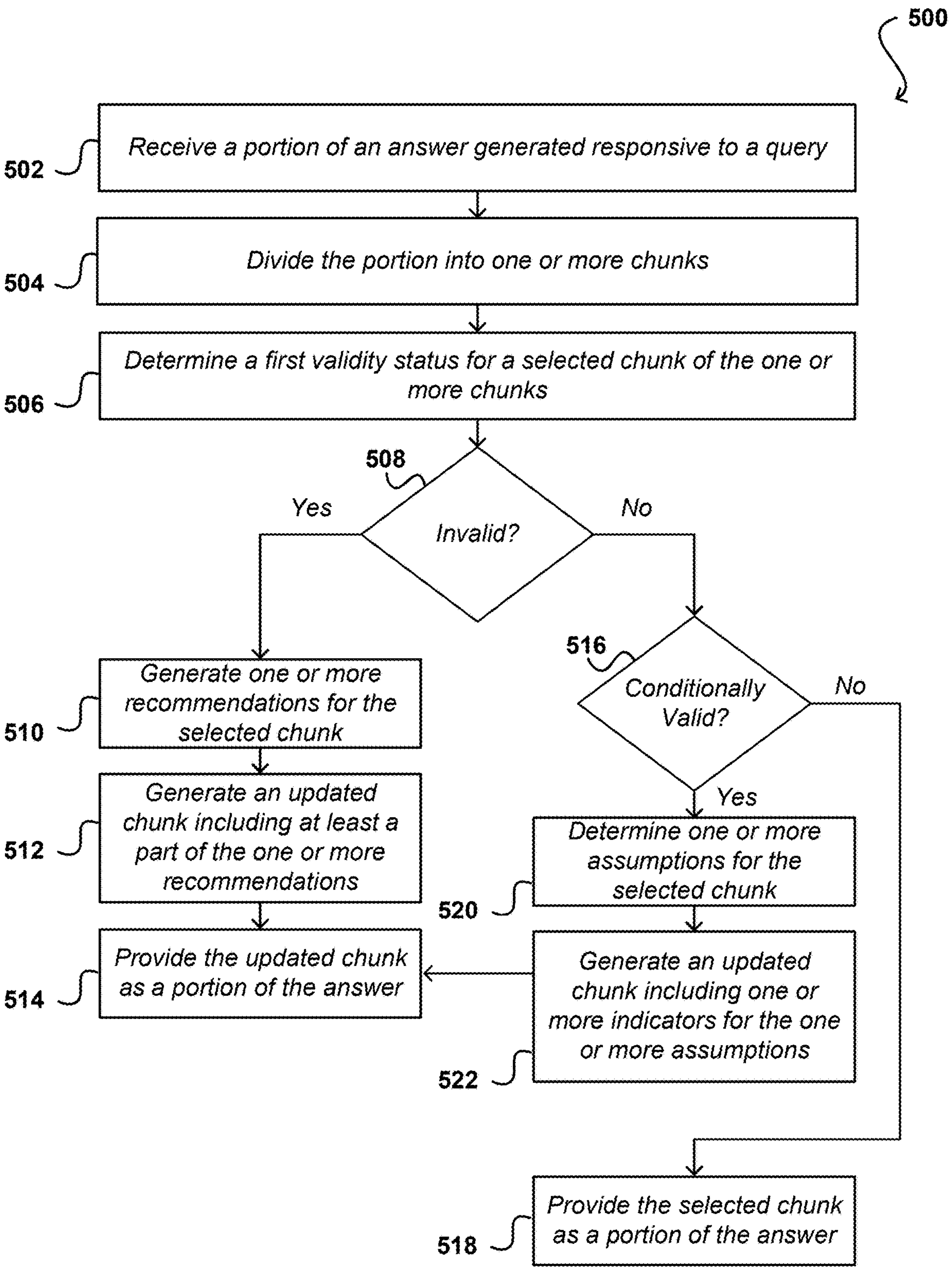
FIG. 5A illustrates an example process for validating generated content that can be utilized in accordance with various embodiments.

FIG. 5A illustrates an example process 500 for validating chunks of generated content that can be used in accordance with at least one embodiment. It should be understood that for this and other processes discussed herein that there may be additional, fewer, or alternative steps performed in similar or alternative orders, or at least partially in parallel, within the scope of the various embodiments unless otherwise specifically stated. In this example, a portion of an answer generated responsive to a query is received 502. The answer may be generated by one or more generative AI systems, such as an LLM, and may include information that is produced in a streaming manner, such as by generating tokens responsive to the query. The portion of the answer may be divided into one or more chunks 504. The chunks may be based on different thresholds or factors, such as character length, disk size, content, delimiters, and/or combinations thereof. In at least one embodiment, a validity status for a selected chunk of the one or more chunks may be determined 506. Validity may refer to the identification of a likelihood of error within the selected chunk, such as a factual error due to a hallucination or the presence of restricted content, among other options.

One or more embodiments may determine whether or not the validity status of the selected chunk is invalid 508. If so, the validity status may be indicative of a likelihood of an error within the selected chunk exceeding a threshold and one or more recommendations to correct the selected chunk may be generated 510. For example, the verification engine and/or one or more additional models may be used to provide recommendations upon receiving a signal indicative of an invalid status for a chunk. However, the one or more recommendations may be omitted in certain embodiments. An updated chunk may then be generated using at least a part of the one or more recommendations 512. The updated chunk may then be provided as the portion of the answer 514.

In embodiments, it may be determined that the validity status of the selected chunk is not invalid and, therefore, a second validity determination may be performed to determine whether or not the selected chunk is conditionally valid 516. If not, then the selected chunk may be provided as the portion of the answer 518. However, if the selected chunk is conditionally valid, then one or more assumptions for the selected chunk may be determined 520. The one or more assumptions may provide information regarding when the selected chunk is valid and/or information used to make the determination that the chunk is valid. An updated chunk including one or more indications for the one or more assumptions may then be generated 522 and provided as a portion of the answer 514. The one or more indications may include features such as links, color changes to draw a user's attention, and/or the like. Furthermore, the one or more indications may be in the form of a further updated chunk that provides information regarding the one or more assumptions within the response. For example, if the original chunk indicated a price for an, but the price was conditional on other factors, the updated chunk may include those conditions within the updated chunk, instead of providing a link or pop up. In this manner, generated chunks may be evaluated for validity and, if needed, updated before providing the portion responsive to the query.

Figure 5B:
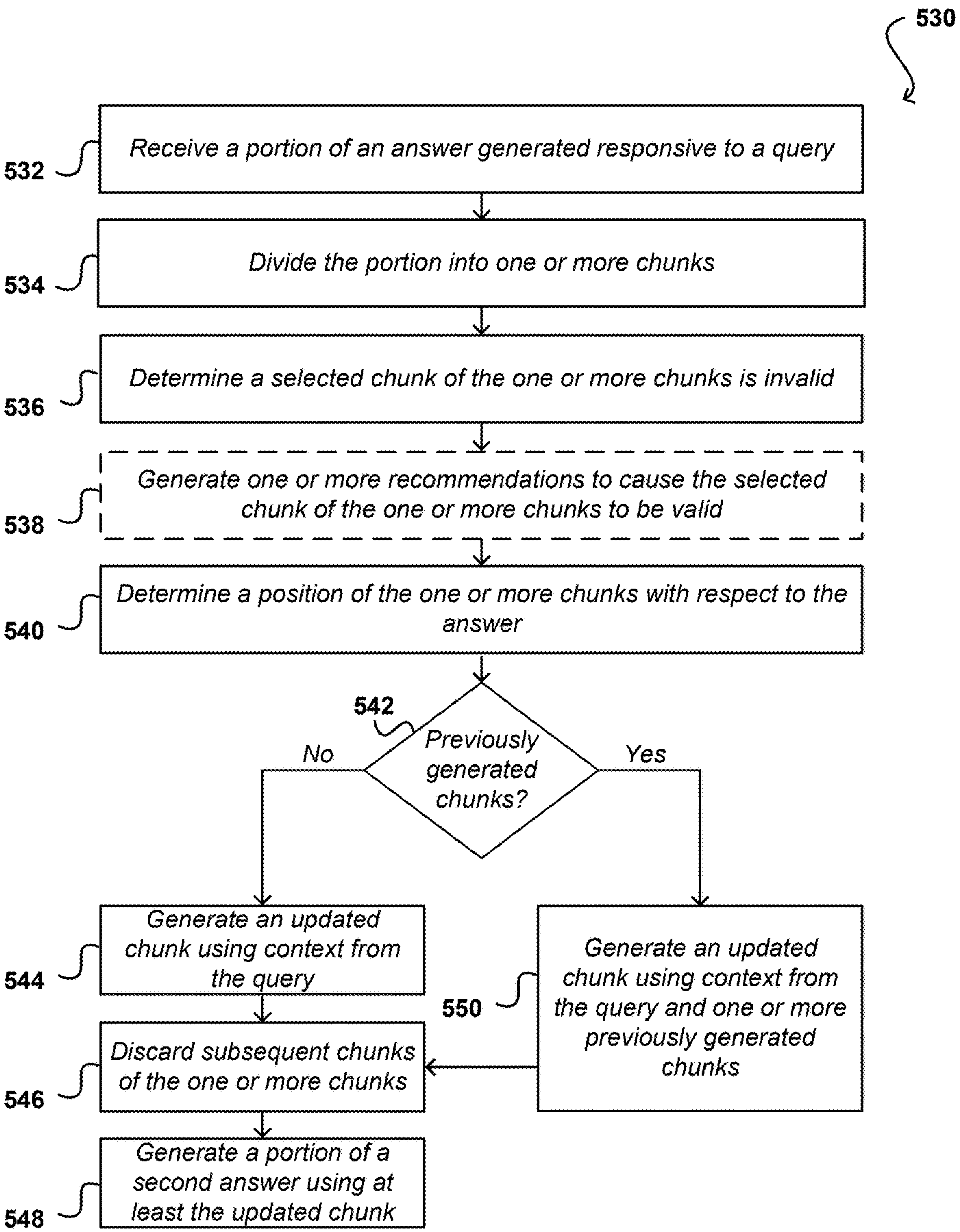
FIG. 5B illustrates an example process for updating invalid content that can be utilized in accordance with various embodiments.

FIG. 5B illustrates an example process 530 for generating updated chunks responsive to an invalidity determination that can be utilized in accordance with various embodiments. In this example, a portion of a generated response to a query is received 532. For example, an LLM may receive a query and generate portions of an answer. The portion may be divided into one or more chunks 534, as discussed herein, and a selected chunk of the one or more chunks may be determined to be invalid 536. An invalid chunk may include a chunk that includes factually inaccurate information, restricted content, formatting/presentation errors, and/or combinations thereof. In certain embodiments, one or more recommendations to cause the selected chunk to be valid may be provided 538. For example, a correction to a factually inaccurate portion of the chunk may be provided.

In at least one embodiment, a position of the chunk with respect to the answer may be determined 540. The position of the chunk may be associated with whether there were chunks before the selected chunk and/or whether there are chunks after the selected chunk. For example, it may be determined whether previously generated chunks are available 542. If not, then an updated chunk may be generated using context from the query 544. Additionally, subsequent chunks may be discarded 546 and a portion of a second answer may be generated using the updated chunk 548. In embodiments where previously generated chunks are available, then the updated chunk may be generated using both the query and at least some of the one or more previously generated chunks 550.

Figure 5C:
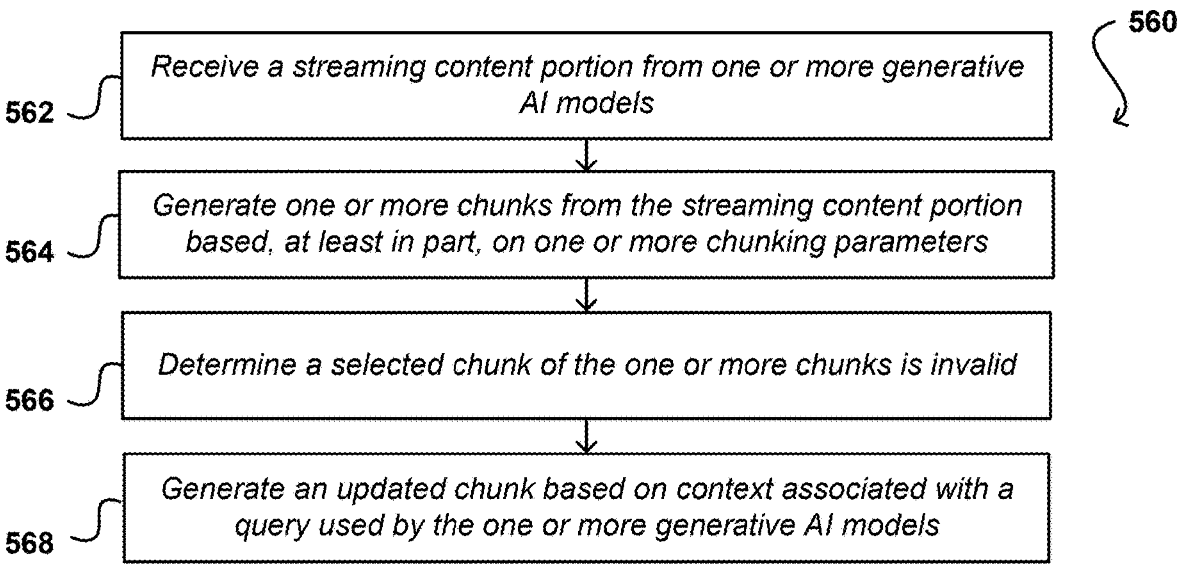
FIG. 5C illustrates an example process for updating invalid content that can be utilized in accordance with various embodiments.

FIG. 5C illustrates an example process 560 for generating updated chunks responsive to an invalidity determination that may be utilized in accordance with various embodiments. In this example, streaming content from one or more generative AI models is received 562. The streaming content may be an answer generated responsive to one or more input queries. One or more chunks may be generated from the streaming content 564. In at least one embodiment, one or more chunking parameters may be used to divide the streaming content into the one or more chunks. A selected chunk of the one or more chunks may be determined to be invalid 566 and then an updated chunk may be generated to replace the invalid chunk 568. The updated chunk may be generated based at least on context associated with the query used by the one or more generative AI models.

Figure 5D:
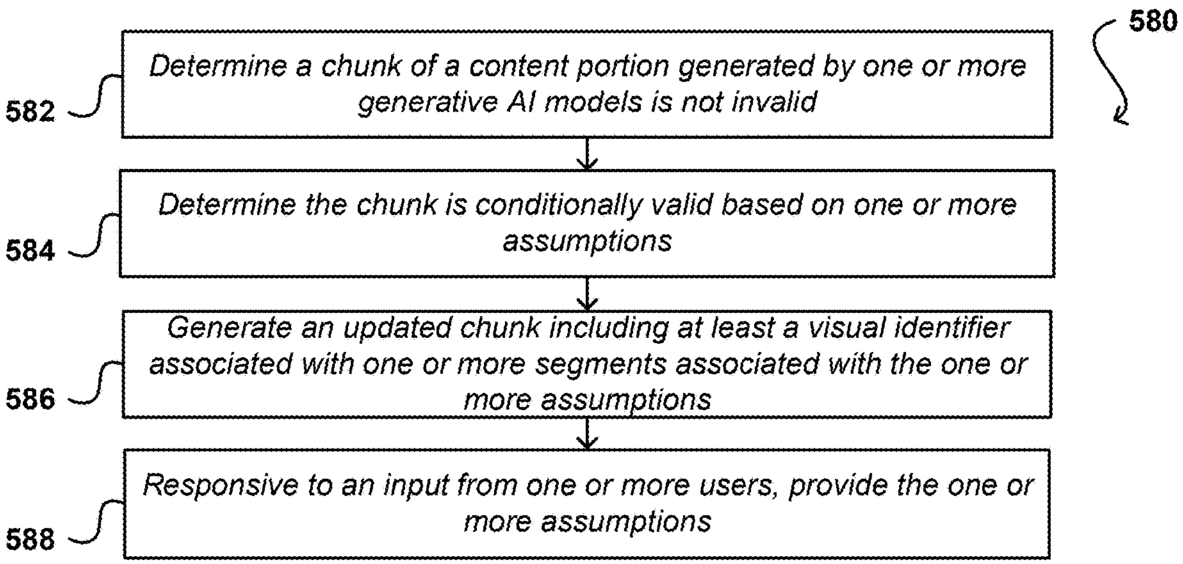
FIG. 5D illustrates an example process for updating conditionally invalid content that can be utilized in accordance with various embodiments.

FIG. 5D illustrates an example process 580 for generating updated chunks responsive to a conditional validity determination that may be utilized in accordance with various embodiments. In this example, a chunk of a content portion generated by one or more generative AI models is determined to be not invalid 582. For example, the chunk may be evaluated and be determined to include factually accurate information. The chunk may further be determined to be conditionally valid based on one or more assumptions 584. For example, the chunk may be valid under certain scenarios or for a given set of facts. An updated chunk may be generated to include at least a visual identifier associated with one or more segments associated with the one or more assumptions 586. For example, a visual output may include some markings over portions of the chunk that are related to the one or more assumptions. Responsive to an input from one or more users, the one or more assumptions may be provided 588. A user may interact with the markings and then be provided with a pop up or be linked to further information, as one example. In this manner, additional content may be provided to users to provide data as to why certain content may be considered valid.

Figure 6:
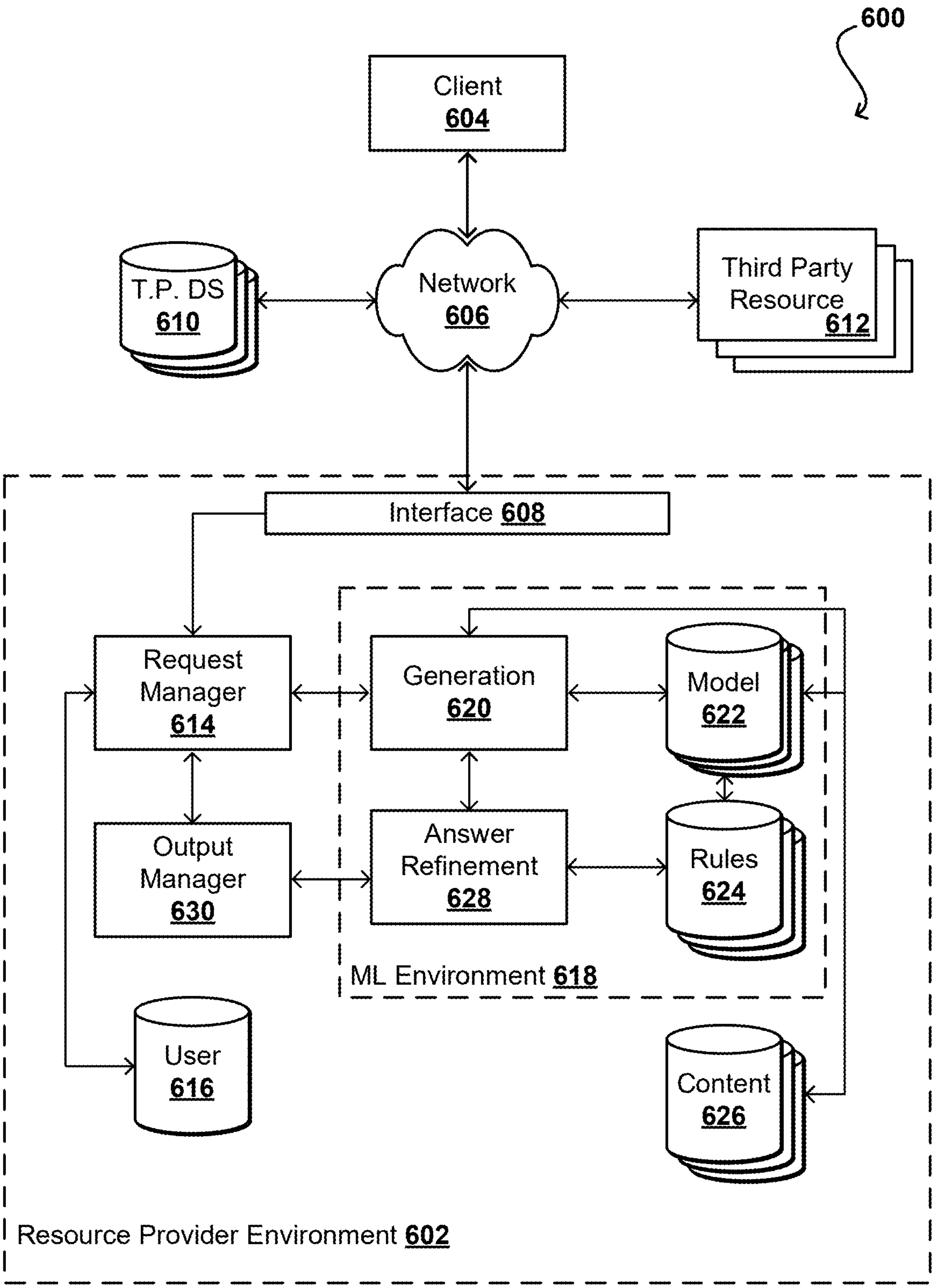
FIG. 6 illustrates an example system for content validation and answer refinement that can be utilized in accordance with various embodiments.

FIG. 6 illustrates an example system 600 for content generation and verification, in accordance with various embodiments of the present disclosure. In this example, content generation may include using one or more generative AI systems, which may include various trained machine learning models. Systems and methods of the present disclosure may further include one or more training processes and/or deployable assets that may be used with and/or augment one or more trained models, which may be separately hosted and/or provided by one or more users.

In this example, a resource provider environment 602 is used to host or otherwise provide access to one or more underlying resources, such as compute resources, storage resources, and/or the like. It should be appreciated that various other components may also be included, or hosted separately in a different environment, and are not shown for clarity with the following discussion. Furthermore, these components are shown by way of example and are not intended to limit the scope of the present disclosure. These resources can include physical and virtual resources that may be located at one or more locations controlled by the provider or a third-party, or may be located at a location controlled by the user, or an entity with which the user is associated. Moreover, various resources may be illustrated as separate blocks or components, but different embodiments may group or otherwise share functionality between different blocks or components.

In this example, a client 604 (e.g., a user, an end-user, an authorized user, a customer, etc.) can obtain access to or use of one or more resources (e.g., compute resources, storage resources, etc.) provided as part of the resource provider environment 602. The client 604 may use one or more client devices to access the resources of the resource provider environment 602 over one or more networks 606. However, one or more embodiments may also include components of the resource provider environment 602 that are locally hosted and/or executed. The client 604 and/or the client device may be referred to interchangeably in that the client device facilitates the interaction with the resource provider environment 602. Moreover, the client device may execute one or more actions or tasks according to one or more rules or instructions stored on different memories such that physical interaction or explicit instructions from the client 604 are not used. By way of example only, the client device may correspond to a computing device programmed to send a signal to execute one or more workflows responsive to receiving an input that may be automated. The client device can include any appropriate electronic device operable to send and receive requests, messages, or other such information over an appropriate network and convey information back to a user of the device and/or convey information that can be confirmed or otherwise analyzed by software executing on the device. Examples of such client devices include personal computers, tablet computers, smart phones, notebook computers, various edge devices, and the like. The network(s) 606 can include any appropriate network, including an intranet, the Internet, a cellular network, a local area network (LAN), or any other such network or combination, and communication over the network can be enabled via wired and/or wireless connections. The resource provider environment 602 can include any appropriate components for receiving requests and returning information or performing actions in response to those requests. As an example, the provider environment might include Web servers and/or application servers for receiving and processing requests, then returning data, access to resources, Web pages, video, audio, or other such content or information in response to the request.

The resource provider environment 602 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services (referred to in various implementations as cloud disks service, a managed disk service, a storage area network service, a persistent disk service, or a block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In various embodiments, the resource provider environment 602 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instances of one or more types of these resources. In at least one embodiment, a resource instance can include storage volumes, compute instances, and network interfaces, among other such options. This can include, for example, enabling a customer to launch one or more instances of one or more types of these resources. The sharing of these multi-tenant resources from a provider environment is often referred to as resource sharing, Web services, or "cloud computing," among other such terms and depending upon the specific environment and/or implementation.

In one embodiment, the resource provider environment 602 can provide access to the resources and may also provide additional monitoring and management services, which can use resource capacity from one or more storage solutions, among other options, to provision resources and/or execute various tasks associated with a user account. In this example, a request to the resource provider environment 602 can be received by an interface layer 608 of the environment. As known for network environments, the interface layer can include components such as interfaces (e.g., application programming interfaces (APIs)), load balancers, request and/or data routers, and the like. In various embodiments, the request submitted by the client 604 may include a request (either a direct request or as part of an automated workflow) to generate content, train one or more generative AI models, access different pre-trained models, and/or combinations thereof. The request may include inputs that are provided to different selected models, for example, a text prompt provided as a request to an LLM. Additionally, one or more embodiments may also include a model or data provided by the client 604, for example from one or more third party datastores 610 and/or access to third parties resources 612, which may include information associated with client preferences, client-hosted models, and/or the like. Embodiments of the present disclosure may be used to process the one or more requests to provide access to different resources, train different models, and/or to generate content using one or more generative AI systems.

In at least one embodiment, the request may include one or more input prompts for use by a trained generative AI system. For example, the request may include a request to generate content according to different parameters. In this example, the request is routed through the interface layer 608 to a request manager 614, which may be referred to as an entry-point for using one or more resources and/or services associated with the resource provider environment 602. For example, the request manager 614 may receive a request and then provision one or more resources to execute an action associated with the request, which may include using one or more compute resources to perform inference operations to generate content and/or to begin one or more training operations, among various other options.

In at least one embodiment, the request manager 614 may be used to verify credentials, which may be provided as part of the request, for one or more clients 604 or authorized agents associated with the client 604. A user datastore 616 may include information for various clients associated with the resource provider environment 602, such as access control restrictions, settings, associated third party resources 612, and/or the like. Different users for the client 604 may also have different levels or authorization levels, which may also be stored and tracked by the resource provider environment 602. For example, a user may be authorized to access a particular model or to access information within a designated corpus, but may be limited with respect to the type of content generation the user may request.

The request manager 614 may also provide a landing page for the user interaction, for example, by deploying or causing a chatbot to be deployed as part of the initial request. The one or more clients 604 may then send multiple additional requests in order to generate content. For example, a first request at the request manager 614 may be used to determine that a user is requesting access to a certain interaction environment, may verify credentials, and may then deploy the interaction environment. Subsequent requests within the interaction environment may then be processed by the request manager 614 and/or in one or more instances associated with the interaction environment.

In the example where the request is to generate content, the request manager 614 may provide the request to a machine learning (ML) environment 618. The ML environment 618 may be a hosted system that uses one or more models, which may be executed within a distributed computing environment associated with the resource provider environment 602 and/or provided to the client 604 for execution on a local system, among other options. In certain embodiments, the ML environment 618 may include underlying resources, such as graphics processing units (GPUs), which may form a portion of the resource provider environment 602. The ML environment 618 may also be a deployable environment that is tuned to a particular entity, for example, as a backend operation hosted by the resource provider environment 602 for execution using one or more systems associated with the entity.

A content generation engine 620 may be used to generate content responsive to the input provide by the client device 604. For example, the content generation engine 620 may include one or more trained generative AI models, such as one or more LLMs, that may receive the input and then produce content based on training parameters associated with the models. The models may be obtained from one or more model datastores 622, which may be linked to or otherwise associated with a set of different entities within an entity datastore 624. For example, the models may have different weights due to being particularly trained for a given entity. Furthermore, models may include sensitive or proprietary information, and as a result, may only be accessible to authorized users. Accordingly, a given model may be selected upon identification of an entity and/or a task associated with the entity.

One or more trained machine learning models may be used as part of the ML environment 618, which may be a distributed system that accesses one or more different models that may be pre-trained and then tuned using different weights and/or the like. For example, if one of the models is an LLM, the LLM may be a general model that is tuned using a set of weights to perform a specific task, which may include extra training information used to adjust weights for a given domain. One or more fine-tuning parameters may be applied to different models from the model datastore 622. For example, the parameters may be associated with weights that may be deployable for one or more models.

One example embodiment may include RAG in order to generate content using a particular corpus or set of information. For example, the content generation engine 620 may use the input to determine a set of search parameters to identify one or more documents within a content datastore 626. The content datastore 626 may include content specifically associated with a given entity, such as internal documentation for access to employees or users. The internal documentation may include, for example, content that includes information specifically associated with the entity, such as contact information, policies/procedures, and other information. As a result, the entity may want the content generation engine 620 to target the content within the content datastore 626 when generating responses to different requests submitted by client devices 604. The identification of the documents may then be used by the one or more models to produce a response, which may be evaluated by an answer refinement engine 628, which may share one or more features of the answer refinement engine 108 discussed in FIG. 1. As discussed herein, the answer refinement engine 628 may analyze information within the generated content to determine a validity status and, based at least in part on the validity status, may generate updated content segments and/or pass content segments to the user. For example, after content segments are either validated and/or updated, an output manager 630 may be used to format or otherwise prepare the response for presentation to the client device 604.

Figure 7:
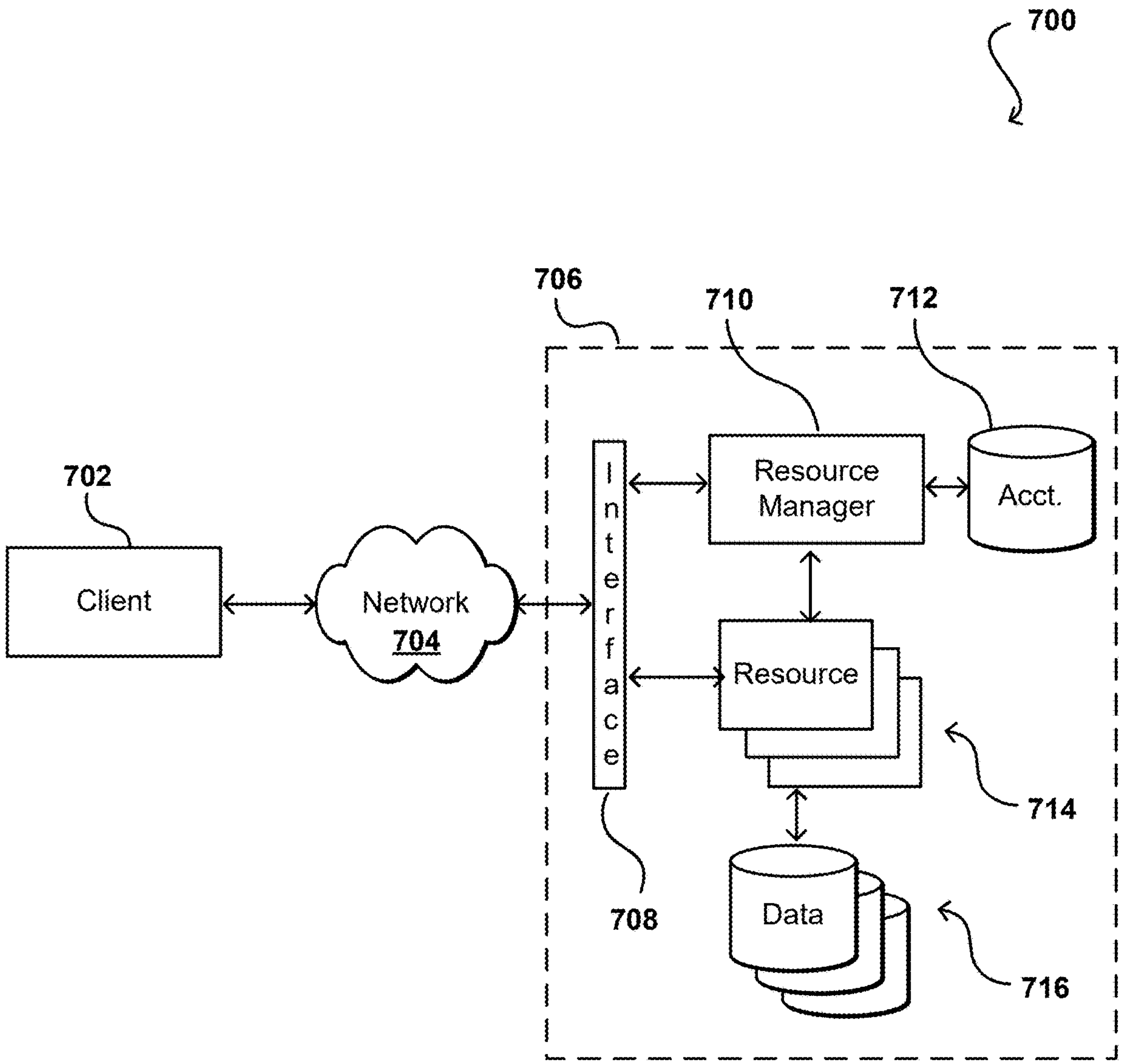
FIG. 7 illustrates an example network-inclusive computing environment in which aspects of various embodiments can be implemented.

FIG. 7 illustrates an example environment 700 in which aspects of various embodiments can be implemented. Such an environment can be used in some embodiments to provide resource capacity for one or more users, or customers of a resource provider, as part of a shared or multi-tenant resource environment. In this example a user is able to utilize a client device 702 to submit requests across at least one network 704 to a multi-tenant resource provider environment 706. This can include an end client that is able to use a certificate for secure communications, where the certificate was obtained using a requestor executing on the end client. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 706 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 702 to communicate with an allocated resource without having to communicate with the resource manager 710, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 8:
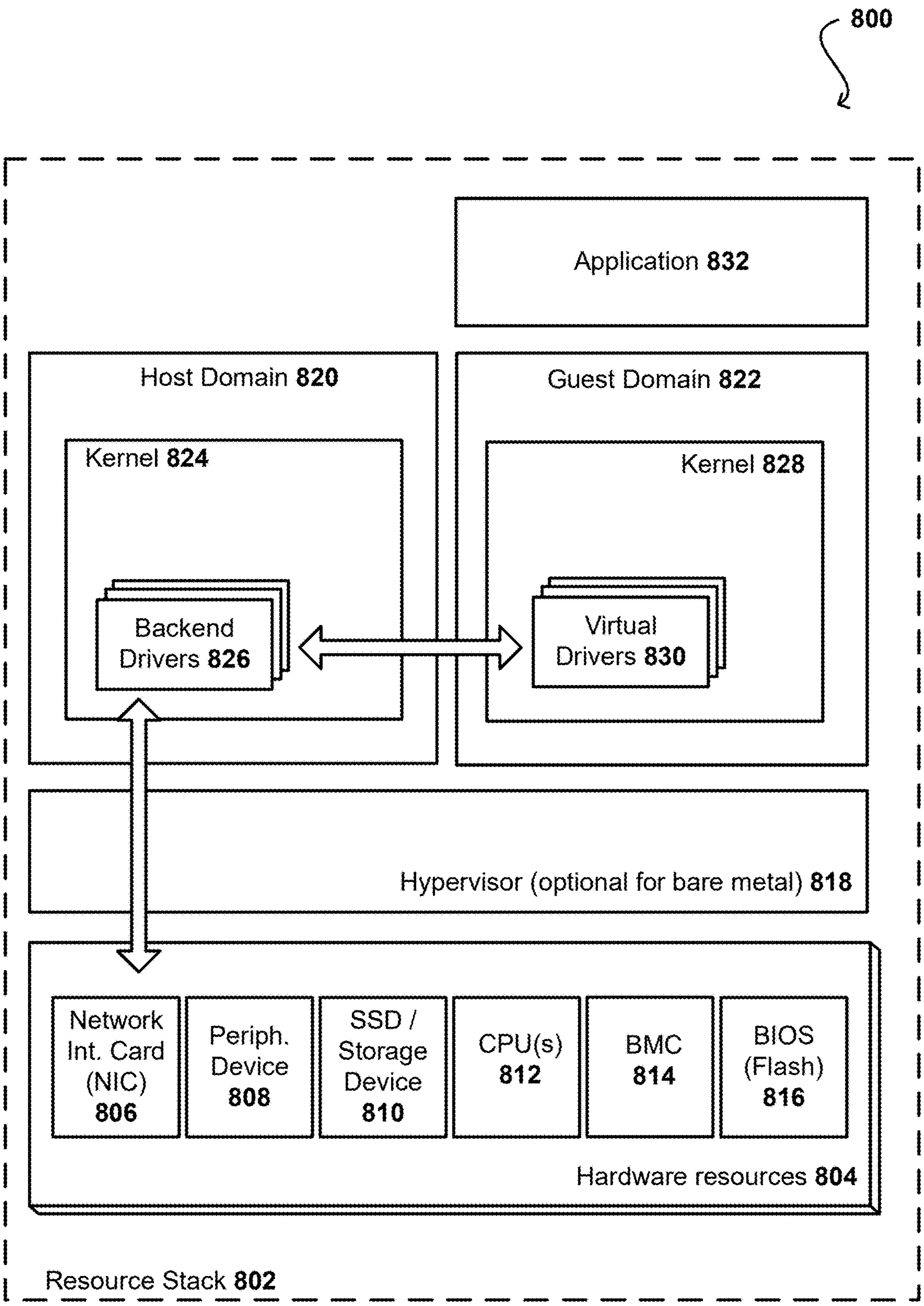
FIG. 8 illustrates example components of a server that can be utilized to perform at least a portion of a transcoding process, in accordance with various embodiments.

FIG. 8 illustrates an example resource stack 802 of a physical resource 800 that can be utilized in accordance with various embodiments. Such a resource stack 802 can be used to provide an allocated environment for a user (or customer of a resource provider) having an operating system provisioned on the resource. In accordance with the illustrated embodiment, the resource stack 802 includes a number of hardware resources 804, such as one or more central processing units (CPUs) 812; solid state drives (SSDs) or other storage devices 810; a network interface card (NIC) 806, one or more peripheral devices (e.g., a graphics processing unit (GPU), etc.) 808, a BIOS implemented in flash memory 816, and a baseboard management controller (BMC) 814, and the like. In some embodiments, the hardware resources 804 reside on a single computing device (e.g., chassis). In other embodiments, the hardware resources can reside on multiple devices, racks, chassis, and the like. Running on top of the hardware resources 804, a virtual resource stack may include a virtualization layer such as a hypervisor 818 for a Xen-based implementation, a host domain 820, and potentially also one or more guest domains 822 capable of executing at least one application 832. The hypervisor 818, if utilized for a virtualized environment, can manage execution of the one or more guest operating systems and allow multiple instances of different operating systems to share the underlying hardware resources 804. Conventionally, hypervisors are installed on server hardware, with the function of running guest operating systems, where the guest operating systems themselves act as servers.

In accordance with an embodiment, a hypervisor 818 can host a number of domains (e.g., virtual machines), such as the host domain 820 and one or more guest domains 822. In one embodiment, the host domain 820 (e.g., the Dom-0) is the first domain created and helps virtualize hardware resources and manage all of the other domains running on the hypervisor 818. For example, the host domain 820 can manage the creating, destroying, migrating, saving, or restoring the one or more guest domains 822 (e.g., the Dom-U). In accordance with various embodiments, the hypervisor 818 can control access to the hardware resources such as the CPU, input/output (I/O) memory, and hypervisor memory.

A guest domain 822 can include one or more virtualized or para-virtualized drivers 830 and the host domain can include one or more backend device drivers 826. When the operating system (OS) kernel 828 in the guest domain 822 wants to invoke an I/O operation, the virtualized driver 830 may perform the operation by way of communicating with the backend device driver 826 in the host domain 820. When the guest driver 830 wants to initiate an I/O operation (e.g., to send out a network packet), a guest kernel component can identify which physical memory buffer contains the packet (or other data) and the guest driver 830 can either copy the memory buffer to a temporary storage location in the kernel for performing I/O or obtain a set of pointers to the memory pages that contain the packet(s). In at least one embodiment, these locations or pointers are provided to the backend driver 826 of the host kernel 824 which can obtain access to the data and communicate it directly to the hardware device, such as the NIC 806 for sending the packet over the network.

It should be noted that the resource stack 802 illustrated in FIG. 8 is only one possible example of a set of resources that is capable of providing a virtualized computing environment and that the various embodiments described herein are not necessarily limited to this particular resource stack. In some embodiments, the guest domain 822 may have substantially native or "bare metal" access to the NIC 806 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 814 can maintain a list of events that have occurred in the system, referred to herein as a system event log (SEL). In at least one embodiment, the BMC 814 can receive system event logs from the BIOS 816 on the host processor. The BIOS 816 can provide data for system events over an appropriate interface, such as an $I^2C$ interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degradation when SELs from the BIOS indicate failure.

As mentioned, in a virtualized environment the hypervisor 818 can prevent the guest operating system, or guest domain 822, from sending such system event log data to the BMC 814. In the case of bare metal access without such a hypervisor, however, user instances can have the ability to send data for system events that spoof events from the BIOS 816. Such activity could lead to compromised bare metal instances being prematurely degraded due to fake system event data produced by the user OS.

In at least one embodiment, however, there will be portions of the physical resource 800 that will be inaccessible to the user OS. This can include, for example, at least a portion of BIOS memory 816. BIOS memory 816 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 816 at boot time, before a user OS is executing on the resource. Once the user OS is executing on the resource, that OS will be prevented from accessing that secret token in BIOS memory 816. In at least one embodiment, this secret token (or other stored secret) can be provided to the BMC 814 when adding system event log events, whereby the BMC 814 can confirm that the event is being sent by the BIOS 816 and not by the user OS.

Figure 9:
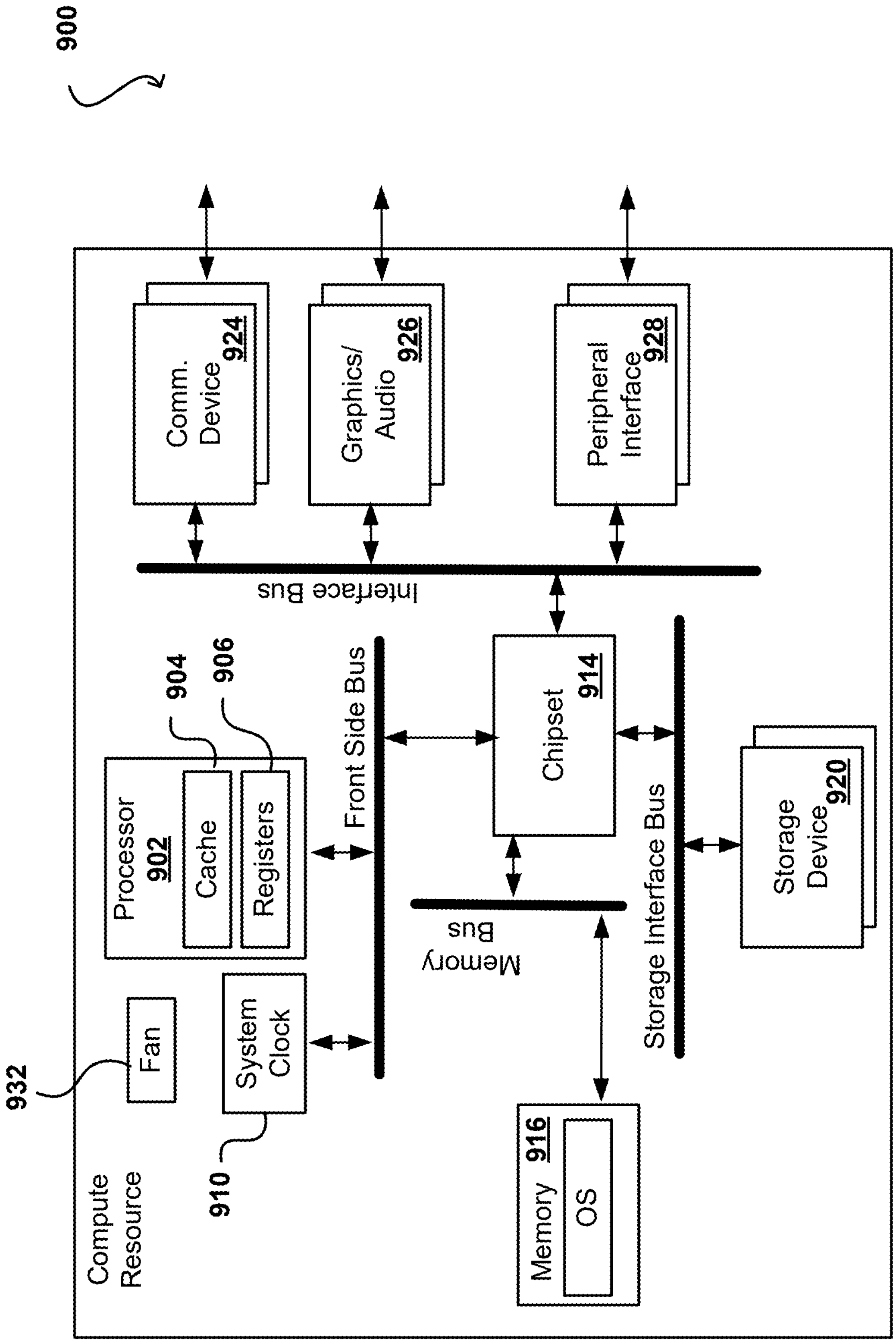
FIG. 9 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 9 illustrates components of an example computing resource 900 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 900 (e.g., a desktop or network server) will have one or more processors 902, such as central processing units (CPUs), graphics processing units (GPUs), and the like, that are electronically and/or communicatively coupled with various components using various buses, traces, and other such mechanisms. A processor 902 can include memory registers 906 and cache memory 904 for holding instructions, data, and the like. In this example, a chipset 914, which can include a northbridge and southbridge in some embodiments, can work with the various system buses to connect the processor 902 to components such as system memory 916, in the form or physical RAM or ROM, which can include the code for the operating system as well as various other instructions and data utilized for operation of the computing device. The computing device can also contain, or communicate with, one or more storage devices 920, such as hard drives, flash drives, optical storage, and the like, for persisting data and instructions similar, or in addition to, those stored in the processor and memory. The processor 902 can also communicate with various other components via the chipset 914 and an interface bus (or graphics bus, etc.), where those components can include communications devices 924 such as cellular modems or network cards, media components 926, such as graphics cards and audio components, and peripheral interfaces 928 for connecting peripheral devices, such as printers, keyboards, and the like. At least one cooling fan 932 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 902 can obtain data from physical memory 916, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 904 in at least some embodiments. The computing resource 900 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 928, a communication device 924, a graphics or audio card 926, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 902 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or take the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resource components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:

in response to a query, receiving a portion of an initial response generated by one or more generative artificial intelligence (AI) systems;

dividing, using the one or more AI systems, the portion of the initial response into two or more chunks;

determining, using the one or more AI systems, a validity status for a selected first chunk of the two or more chunks is invalid;

modifying, using the one or more AI systems, the selected first chunk to generate an updated first chunk;

determining, using the one or more AI systems, the validity status of the updated first chunk is valid;

in response to determining the validity status for the updated first chunk is valid, incorporating, using the one or more AI systems, the updated first chunk into a final response, wherein the final response includes at least another chunk created from dividing the portion of the initial response; and outputting, using the one or more AI systems, the final response that is different than the initial response.

2. The computer-implemented method of claim 1, further comprising:

determining, using the one or more AI systems, a second validity status for a selected second chunk of the two or more chunks is not invalid;

determining, using the one or more AI systems, a third validity status for the selected second chunk of the two or more chunks in conditionally valid;

determining, using the one or more AI systems, one or more assumptions, for the selected second chunk, associated with the third validity status; and generating, using the one or more AI systems, an updated second chunk including one or more indicators corresponding to the one or more assumptions.

3. The computer-implemented method of claim 1, further comprising:

determining, using the one or more AI systems, a second validity status for a second selected chunk of the two or more chunks is not invalid;

determining, using the one or more AI systems, a third validity status for the second selected chunk of the two or more chunks is not conditionally valid; and providing, using the one or more AI systems, the second selected chunk as at least a second part of the portion of the final response.

4. The computer-implemented method of claim 1, wherein a chunk byte size of the two or more chunks is selected to enable:

a time to display a first byte of the final response to be less than ten seconds from the time the query is received; or a time to categorize a chunk of the two or more chunks into at least one of valid, invalid, or conditionally valid is less than five seconds.

5. The computer-implemented method of claim 1, wherein the validity status corresponds to a likelihood of including one or more errors associated with at least one of a factual error, a presentation error, or inclusion of specified content.

6. A computer-implemented method, comprising:

dividing, using one or more generative artificial intelligence (AI) systems, a streaming content segment from a content generation system into two or more chunks;

determining, using the one or more AI systems, a selected chunk of the two or more chunks is invalid;

generating, using the one or more AI systems, from the selected chunk, an updated chunk including at least context associated with a query used to generate the streaming content segment and one or more previously generated valid chunks;

discarding, using the one or more AI systems, one or more subsequent chunks of the two or more chunks; and generating, using the one or more AI systems, a second streaming content segment responsive to the query including the updated chunk to replace the streaming content segment.

7. The computer-implemented method of claim 6, further comprising:

determining, using the one or more AI systems, a previous chunk, temporally earlier than the selected chunk, is valid;

providing, using the one or more AI systems, the previous chunk as a portion of an output response; and using the previous chunk as the one or more previously generated valid chunks.

8. The computer-implemented method of claim 6, further comprising:

dividing, using the one or more AI systems, the second streaming content segment into two or more second chunks;

determining, using the one or more AI systems, a second selected chunk of the two or more second chunks is valid; and providing, using the one or more AI systems, the second selected chunk as a portion of an output response.

9. The computer-implemented method of claim 6, further comprising:

dividing, using the one or more AI systems, the second streaming content segment into two or more second chunks;

determining, using the one or more AI systems, a second selected chunk of the two or more second chunks is not invalid;

determining, using the one or more AI systems, the second selected chunk of the two or more second chunks is conditionally valid;

determining, using the one or more AI systems, one or more assumptions associated with the conditionally valid determination;

generating an updated second selected chunk including one or more indicators associated with the one or more assumptions; and providing the updated second selected chunk as a portion of an output response.

10. The computer-implemented method of claim 9, wherein the one or more indicators include at least one of a graphical icon, a selectable element, a color change, or textual description.

11. The computer-implemented method of claim 9, further comprising:

dividing, using the one or more AI systems, the second streaming content segment into two or more second chunks;

determining, using the one or more AI systems, a second selected chunk of the two or more second chunks is not invalid;

determining, using the one or more AI systems, the second selected chunk of the two or more second chunks is not conditionally valid; and providing, using the one or more AI systems, the updated second selected chunk as a portion of an output response.

12. The computer-implemented method of claim 6, wherein the selected chunk being invalid is based on a likelihood of including one or more errors associated with at least one of a factual error, a presentation error, or inclusion of specified content.

13. The computer-implemented method of claim 6, further comprising:

generating, using the one or more AI systems, one or more recommendations for the selected chunk associated with causing the selected chunk to be at least one of valid or not invalid.

14. The computer-implemented method of claim 6, wherein a chunk byte size of the two or more chunks is selected to enable:

a time to display a first byte of the output response to be less than ten seconds from the time the query is received; or a time to categorize a chunk of the two or more chunks into at least one of valid, invalid, or conditionally valid is less than five seconds.

15. A system, comprising:

at least one processor; and memory including instructions that, when executed by the at least one processor, cause the system to execute one or more generative artificial intelligence (AI) systems to:

divide a streaming content segment from a content generation system into two or more chunks;

determine a selected chunk of the two or more chunks is invalid;

generate, from the selected chunk, an updated chunk including at least context associated with a query used to generate the streaming content segment and one or more previously generated valid chunks;

discard one or more subsequent chunks of the two or more chunks; and generate a second streaming content segment responsive to the query including the updated chunk to replace the streaming content segment.

16. The system of claim 15, wherein the instructions when executed further cause the system to:

determine a previous chunk, temporally earlier than the selected chunk, is valid;

provide the previous chunk as a portion of an output response; and use the previous chunk as the one or more previously generated valid chunks.

17. The system of claim 15, wherein the instructions when executed further cause the system to:

divide the second streaming content segment into two or more second chunks;

determine a second selected chunk of the two or more second chunks is valid; and provide the second selected chunk as a portion of an output response.

18. The system of claim 15, wherein the instructions when executed further cause the system to:

divide the second streaming content segment into two or more second chunks;

determine a second selected chunk of the two or more second chunks is not invalid;

determine the second selected chunk of the two or more second chunks is conditionally valid;

determine one or more assumptions associated with the conditionally valid determination;

generate an updated second selected chunk including one or more indicators associated with the one or more assumptions; and provide the updated second selected chunk as a portion of an output response.

19. The system of claim 18, wherein the one or more indicators include at least one of a graphical icon, a selectable element, a color change, or textual description.

20. The system of claim 18, wherein the instructions when executed further cause the system to:

divide the second streaming content segment into two or more second chunks;

determine a second selected chunk of the two or more second chunks is not invalid;

determine the second selected chunk of the two or more second chunks is not conditionally valid; and provide the updated second selected chunk as a portion of the output response.

* * * * *